US007596511B2

(12) United States Patent
Hall et al.

(10) Patent No.: US 7,596,511 B2
(45) Date of Patent: Sep. 29, 2009

(54) CLOSING SYSTEM FOR CLOSING REAL-ESTATE TRANSACTIONS BETWEEN A PLURALITY OF PARTIES

(75) Inventors: Adam Hall, Los Angeles, CA (US); Chendal P. Coulter, La Mesa, CA (US); Ken S. Miller, Malibu, CA (US)

(73) Assignee: iClosings.com, Santa Monica, CA (US)

( * ) Notice: Subject to any disclaimer, the term of this patent is extended or adjusted under 35 U.S.C. 154(b) by 764 days.

(21) Appl. No.: 10/696,274

(22) Filed: Oct. 29, 2003

(65) Prior Publication Data

US 2005/0096996 A1 May 5, 2005

Related U.S. Application Data

(62) Division of application No. 09/643,274, filed on Aug. 22, 2000, now Pat. No. 7,085,735.

(51) Int. Cl.
*G06F 17/30* (2006.01)
*G06Q 30/00* (2006.01)
(52) U.S. Cl. .................................. 705/26; 705/1; 705/27
(58) Field of Classification Search ...................... 705/1, 705/26–27, 37
See application file for complete search history.

(56) References Cited

U.S. PATENT DOCUMENTS

| 5,191,613 | A | * | 3/1993 | Graziano et al. ............ 713/176 |
| 5,500,793 | A |   | 3/1996 | Deming, Jr. et al. |
| 5,664,115 | A |   | 9/1997 | Fraser |
| 5,689,705 | A | * | 11/1997 | Fino et al. .................... 707/201 |
| 5,692,206 | A |   | 11/1997 | Shirley et al. |
| 5,794,207 | A | * | 8/1998 | Walker et al. .................. 705/1 |
| 5,910,987 | A | * | 6/1999 | Ginter et al. .................. 705/52 |
| 5,970,470 | A |   | 10/1999 | Walker et al. |
| 6,185,683 | B1 | * | 2/2001 | Ginter et al. ................ 713/176 |
| 6,219,423 | B1 | * | 4/2001 | Davis ......................... 380/268 |
| 6,684,189 | B1 | * | 1/2004 | Ryan et al. ..................... 705/4 |
| 6,684,196 | B1 | * | 1/2004 | Mini et al. .................... 705/26 |
| 7,024,397 | B1 | * | 4/2006 | Donahue ..................... 705/80 |
| 2001/0005829 | A1 | * | 6/2001 | Raveis, Jr. ..................... 705/1 |
| 2001/0047328 | A1 | * | 11/2001 | Triola ......................... 705/39 |
| 2002/0052814 | A1 | * | 5/2002 | Ketterer ...................... 705/35 |
| 2002/0059137 | A1 | * | 5/2002 | Freeman et al. ............... 705/38 |
| 2003/0055778 | A1 | * | 3/2003 | Erlanger ...................... 705/38 |
| 2004/0039581 | A1 | * | 2/2004 | Wheeler ....................... 705/1 |
| 2004/0054606 | A1 | * | 3/2004 | Broerman .................... 705/27 |

OTHER PUBLICATIONS

"Automating Real-Estate Closings". Frost, Jeffrey M. Computer Corner. Aug. 1984. vol. 70. [recovered from EIC-Dialog search on Dec. 19, 2008].*

* cited by examiner

*Primary Examiner*—Jeffrey A. Smith
*Assistant Examiner*—William J. Allen

(57) ABSTRACT

The present invention is a method and system for closing a real estate sale over a computerized network. More particularly, the present invention enables the parties to a pending real estate sale to enter closing instructions into the system via the Internet and provides the means for electronically processing the closing of such sale in accordance with such closing instructions without the need for a human closing agent.

16 Claims, 24 Drawing Sheets

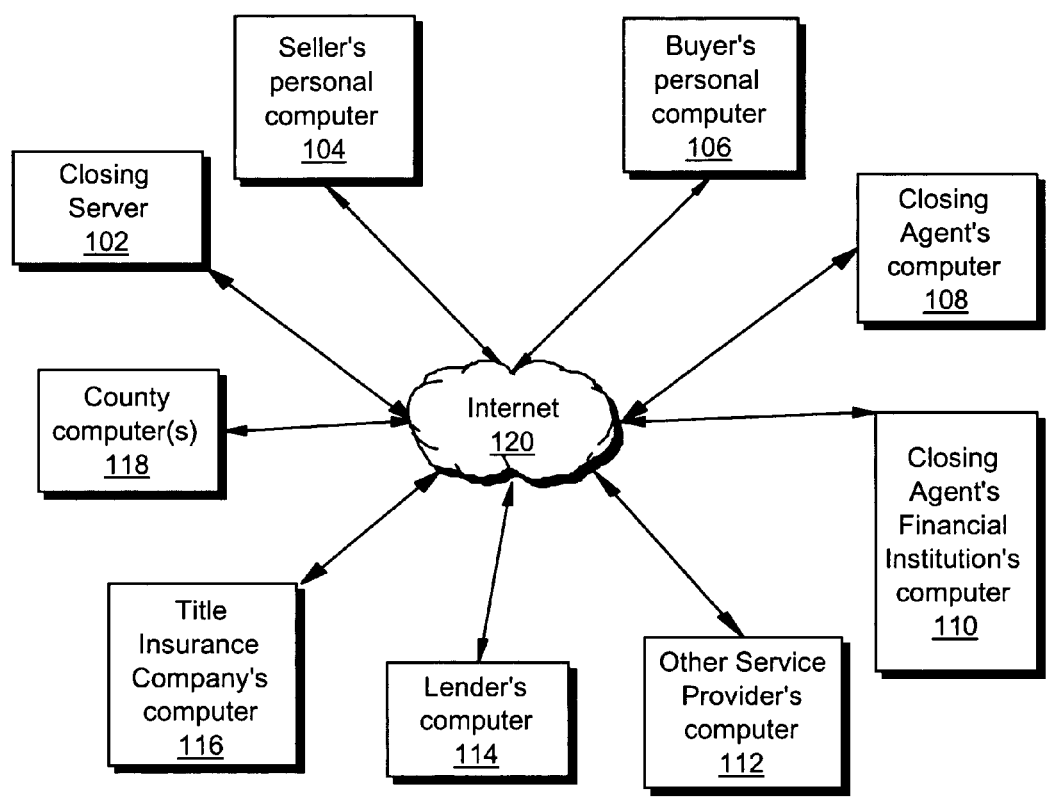

Closing
Server

Transaction Database Scheme

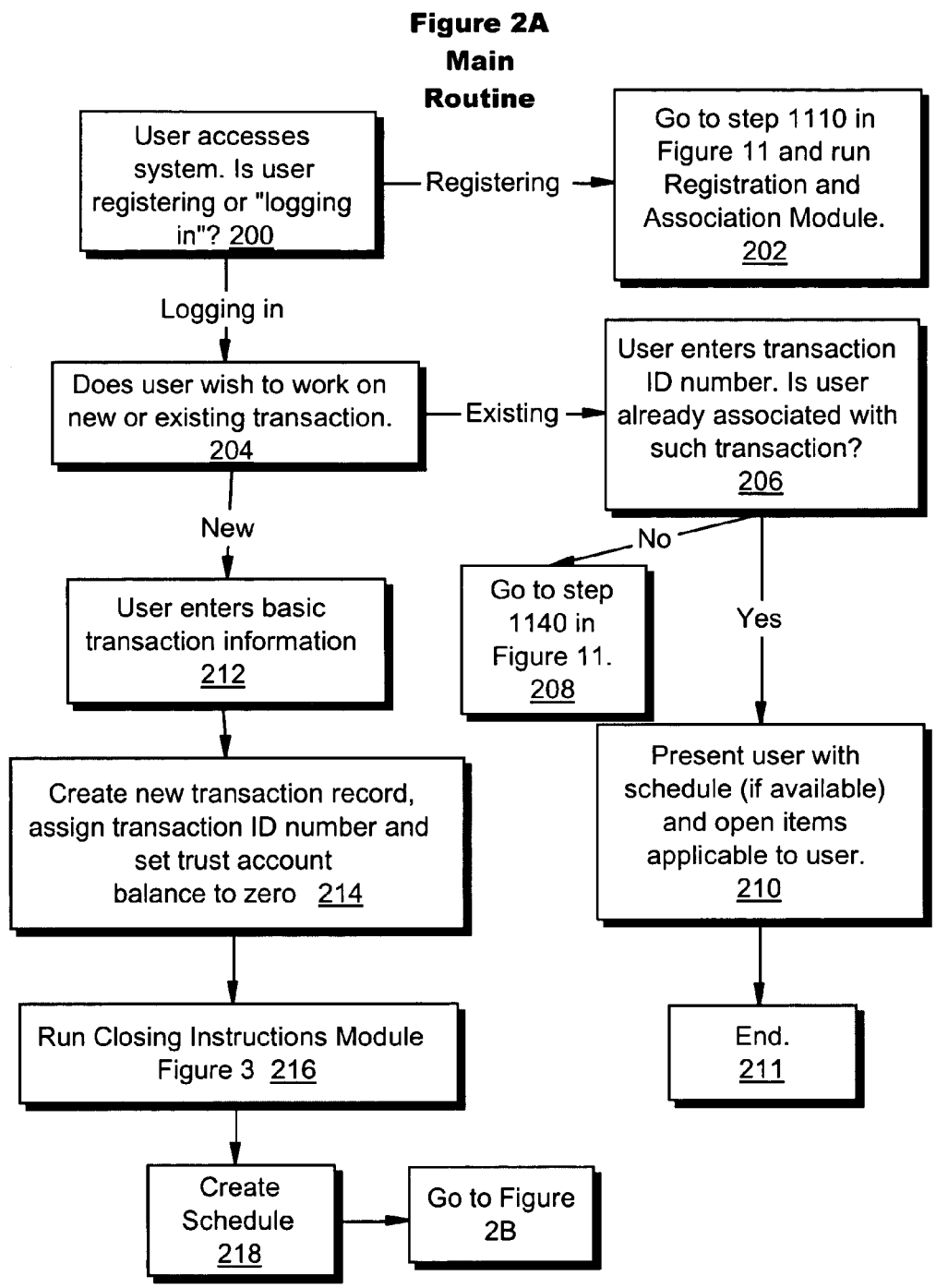

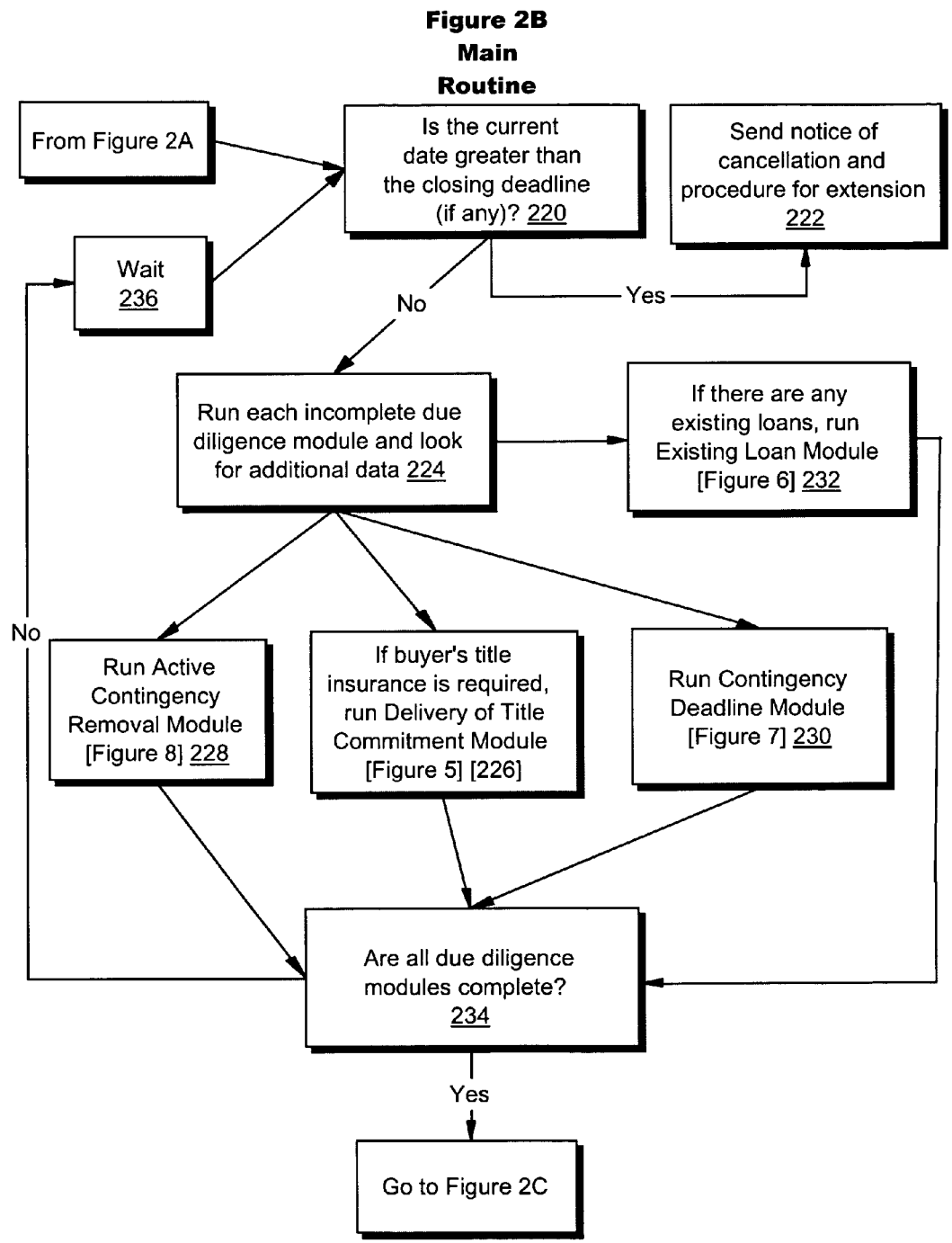

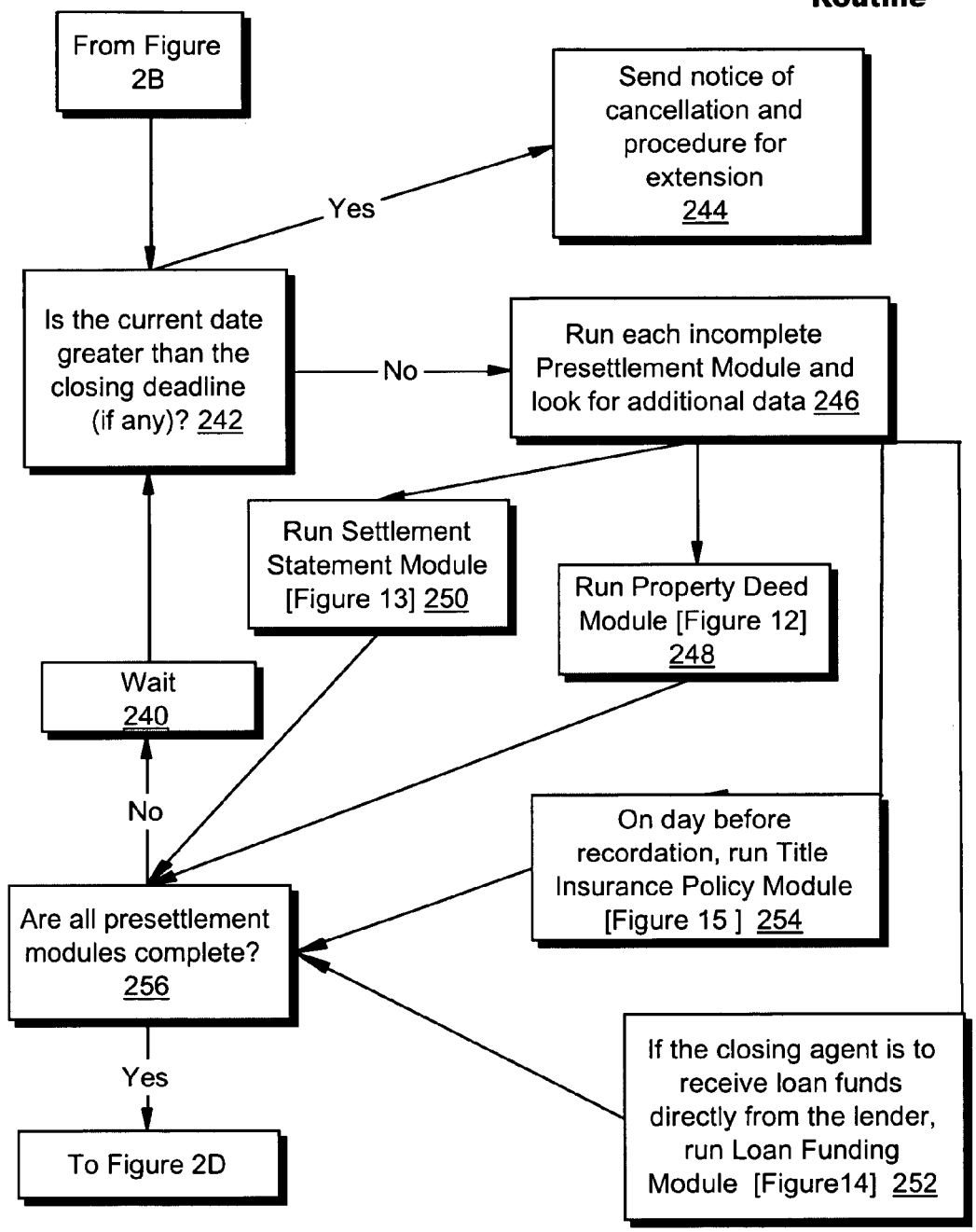
Figure 2C Main Routine

Main Routine**

Main
Routine

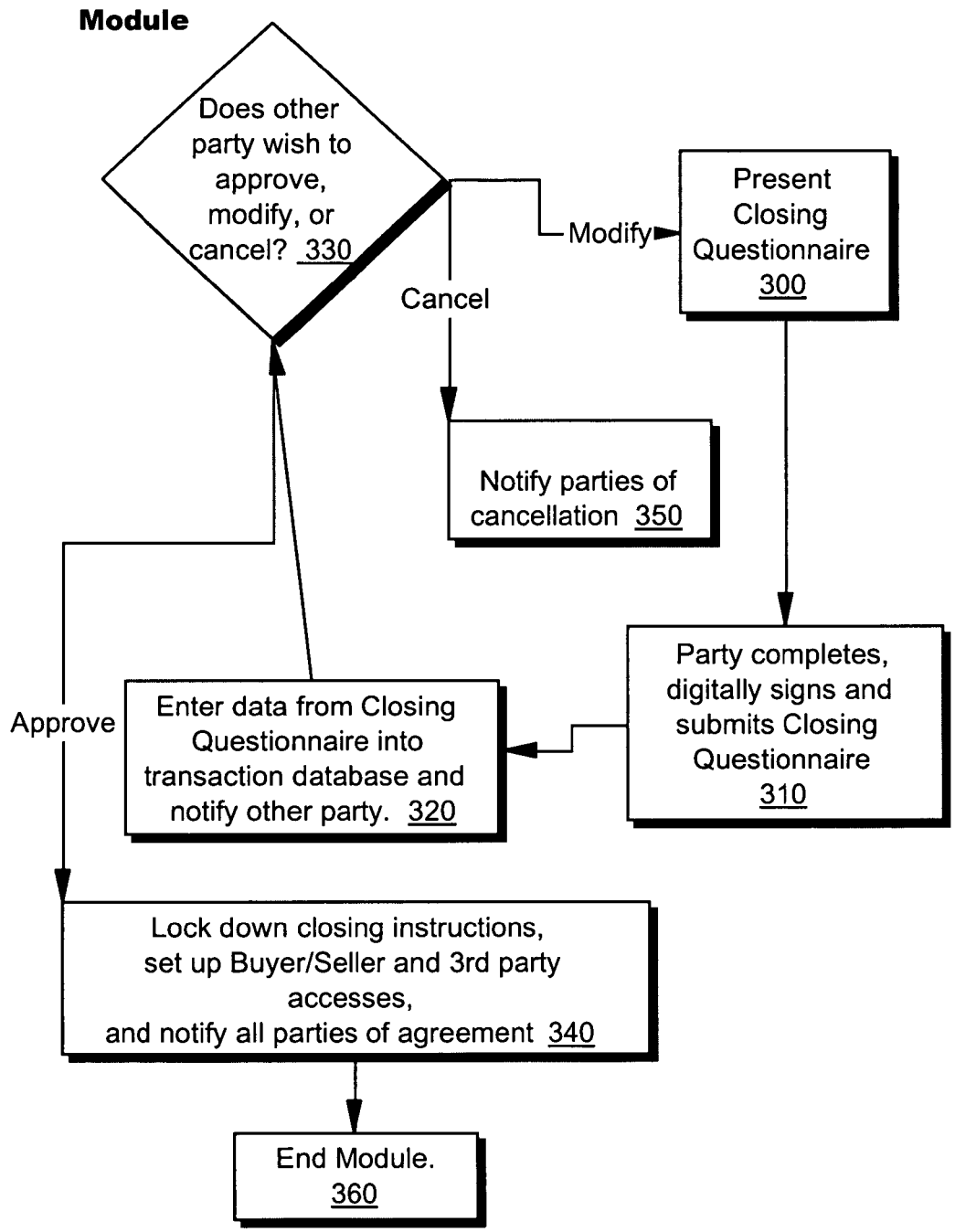

FIGURE 4
TRUST ACCOUNTING MODULE

Upon receipt of deposit confirmation from closing agent's bank or disbursement confirmation from closing agent, determine applicable transaction.
410

↓

Access transaction database and enter the deposit or disbursement into record for applicable transaction.
420

↓

Add funds received to, subtract funds disbursed from, trust account balance.
430

↓

End Module.
440

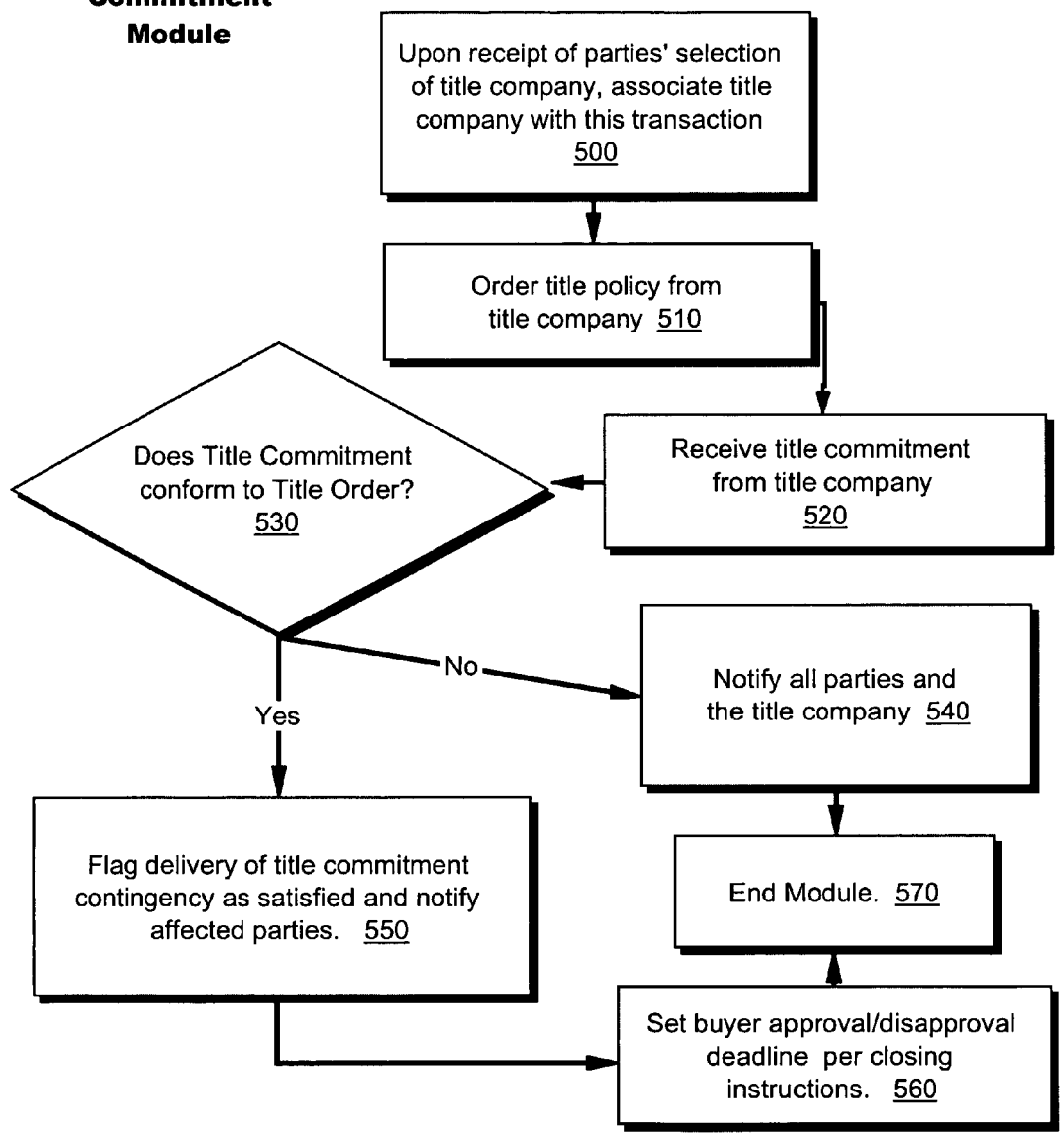

Existing
Loan Module**

Contingency
Deadline
Module

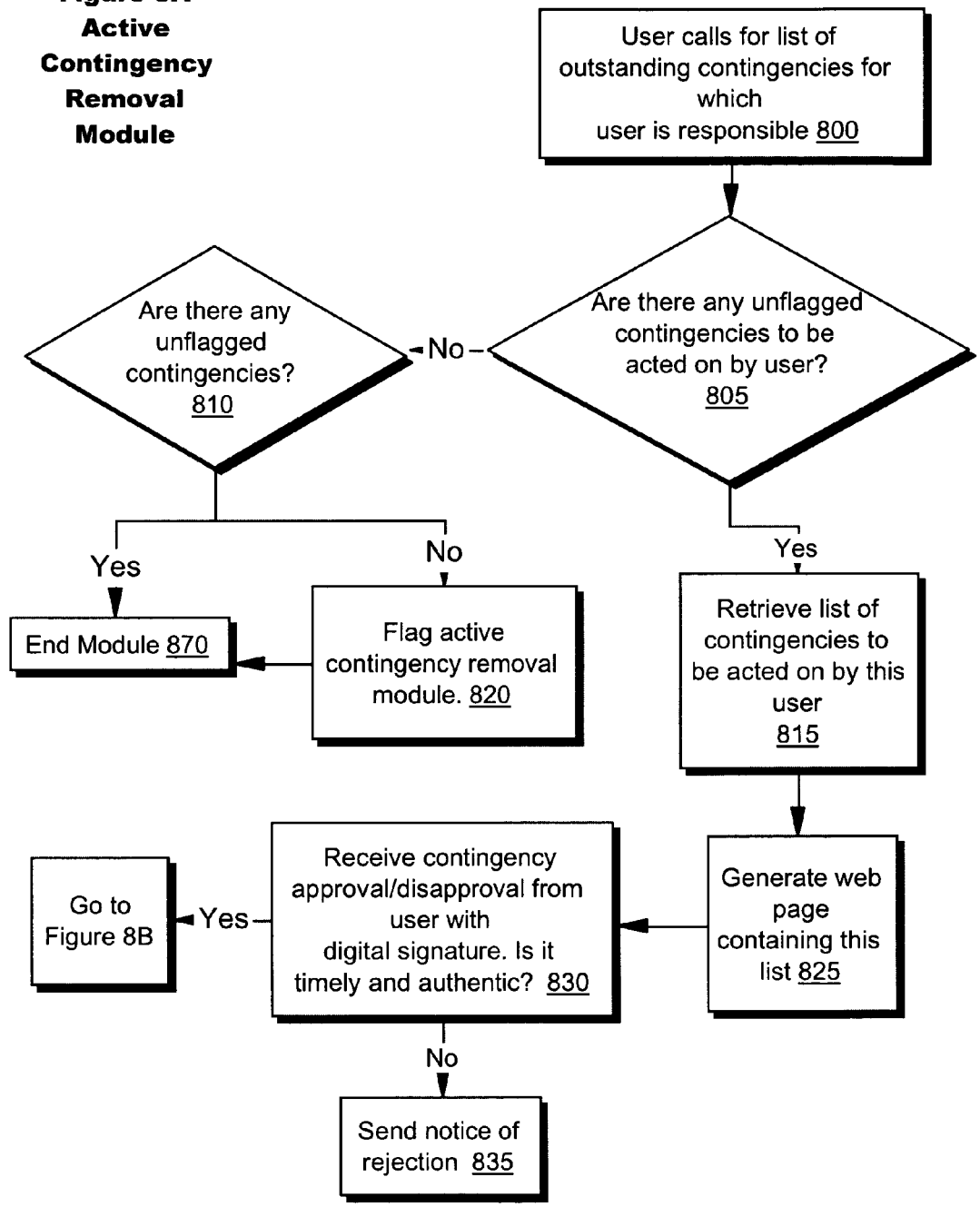

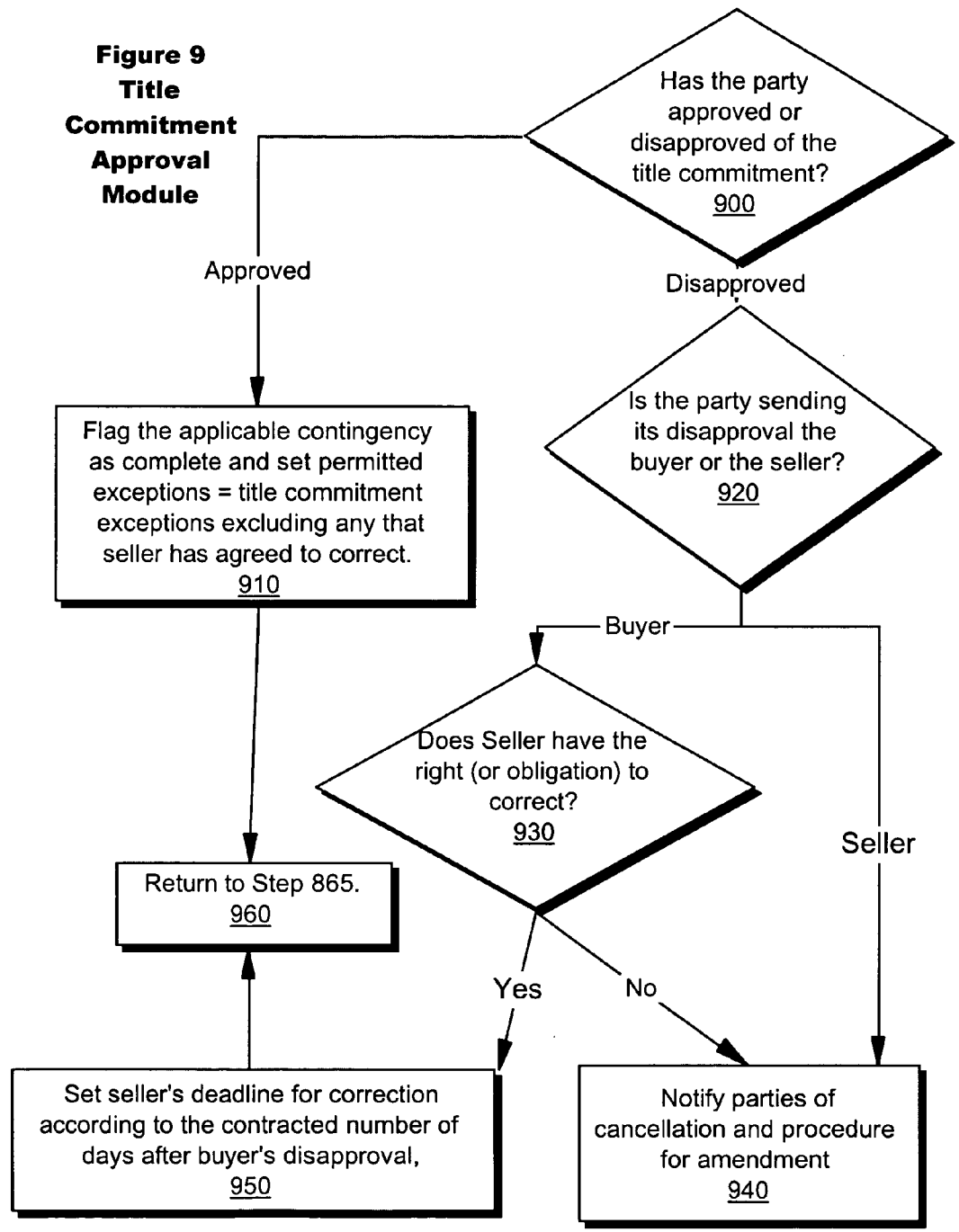

Amendment
Module**

Property
Deed
Module**

Loan Funding Module

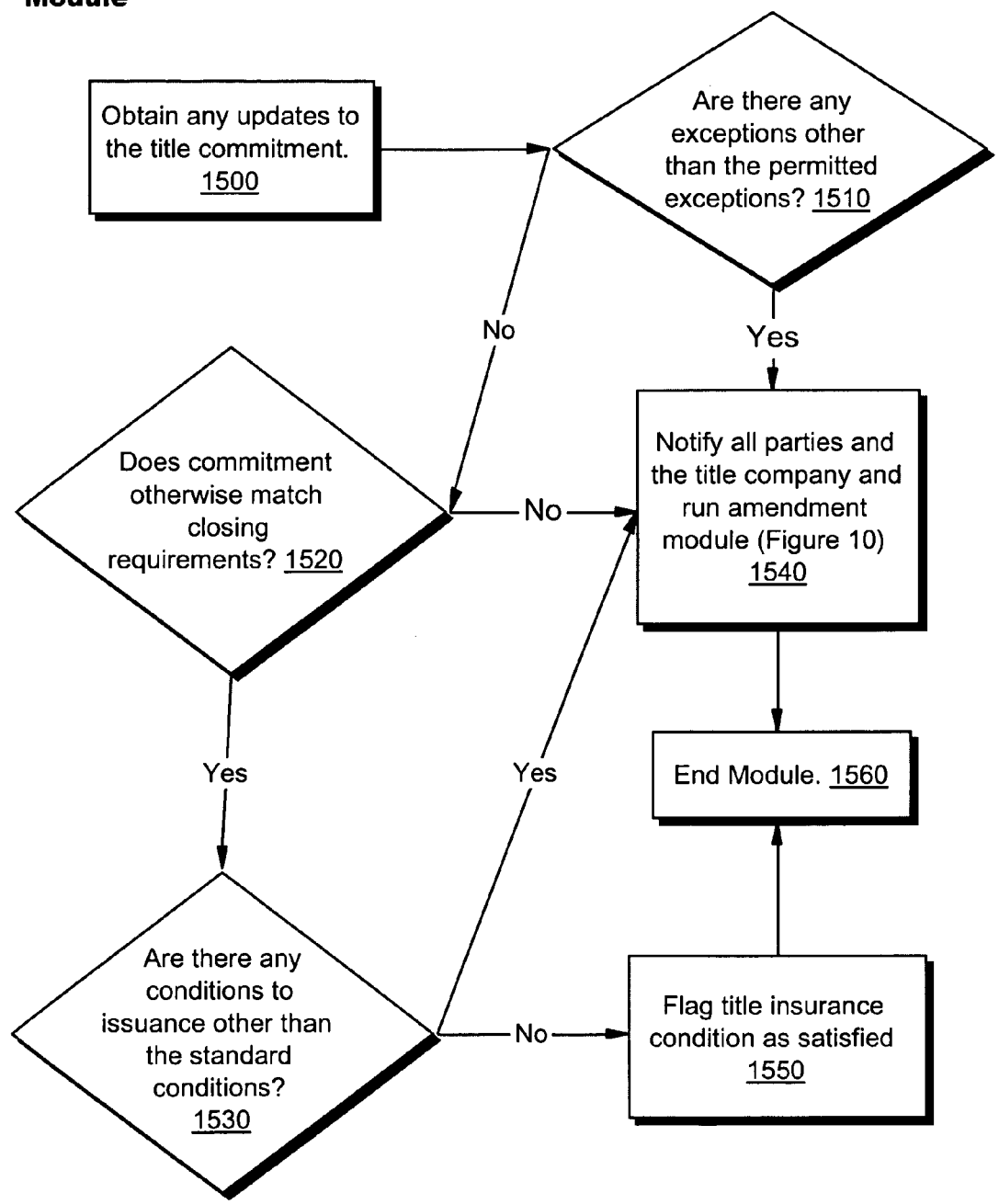

1. _____ (Buyer) agrees to buy from _____ (Seller) and Seller agrees to sell to Buyer the property described as follows: [Enter legal description of the property]

2. On _____ (the Settlement Date) the Seller will convey fee simple title to Buyer. [Specify form of deed by clicking on the deed button and selecting a form from the list.]

3. Buyer shall pay Seller the sum of $ _____ (Purchase Price) on or before the Settlement Date. The Purchase Price will be paid in the form of: [check all that are applicable]

☐ assumption of existing loan # _____ from _____ (name of Lender) _____ (Lender's User ID number)
    ☐ new loan in the following amount: _____
    ☐ balance in cash from Buyer 4. _____ From sale proceeds, pay off loan # _____ from _____(name of lender) _____ (Lender's User ID number).

5. Buyer's obligation to purchase the Property is subject to the following contingencies:

___ a. Buyer to receive satisfactory financing of a portion of the Purchase Price. This contingency is to be removed by the _____ active method or the _____ passive method. Approval and disapproval must be made by notice from___ buyer _____ seller on or before (enter date): _____

___ b. i. Title Insurance will be issued by: [select title insurance company by clicking on button for registered title insurance companies and selecting from the list.] or _____ to be selected by (choose one): _____ buyer _____ seller or _____ both buyer and seller. The title insurance premium is to be paid: (enter number between 0 and 100) _____ % by Seller, the balance (if any) by Buyer.

ii. Buyer's Title Insurance shall be of the following type with the following endorsements, if any: [select title insurance policy type by clicking on the title policy button and selecting from the following list; then select any desired endorsement from the list of endorsements available with such policy.]

iii. Buyer shall be provided with a Title Commitment covering the Property within the following number of days after this Agreement is made: [enter number of days _____] This contingency may be removed only by the active method.

Figure 16A iv. After receiving the Title Commitment, the buyer will be given an opportunity to approve or disapprove of the condition of title. Buyer's deadline for responding will occur how many days after Buyer's receipt of the Title Commitment: [enter number here _____] This contingency is to be removed by the (choose one): _____ active method _____ passive method. (Note that if title objections are correctible, removal must be by the passive method.)

v. If Buyer disapproves of an exception to title, then:
   Choose one: _____ Contract terminates
         _____ Seller has [enter number here _____]
   days to agree to correct the objected to exception(s). This contingency is to be removed by the active method.

___ c. [Enter exact text of miscellaneous contingency #1:] _____
  (Example, "no hazardous waste on the Property"). This contingency is to be removed by: _____ notice from buyer _____ notice from Seller ___ by (choose one): _____ passive method _____ active method. On or before (enter date): _____

___ d. [Enter exact text of miscellaneous contingency #2:] _____
  (Example, "no hazardous waste on the Property"). This contingency is to be removed by: _____ notice from buyer _____ notice from Seller ___ by (choose one): _____ passive method _____ active method. On or before (enter date): _____

6. Click on closing agent button and select a closing agent from the list.

7. Closing costs are to be allocated as follows:

Closing agent's fee shall be split equally between buyer and seller unless otherwise specified here. (Allocate closing agent's fee _____ % to Buyer and the balance to Seller.)

The transfer tax shall be paid (enter number between 0 and 100) _____ % by Seller, the balance (if any) by Buyer.

Recording fees shall be paid by (choose one): _____ Buyer _____ Seller.

8. Enter any additional terms which do not affect the closing instructions and about which the closing agent need not be concerned: (Enter such terms here.)

After completion, click on the submit button and follow instruction for affixing your digital signature.

Figure 16B

CLOSING SYSTEM FOR CLOSING REAL-ESTATE TRANSACTIONS BETWEEN A PLURALITY OF PARTIES

RELATED APPLICATION DATA

This application is a divisional of U.S. patent application Ser. No. 09/643,274 by Adam Hall, Chendal P. Counter and Ken S. Miller, entitled "System and Method for Conducting the Closing of a Real Estate Sale Over a Computerized Network", filed 22 Aug. 30, 2000; which application claims the benefit of Provisional Application No. 60/184,312 entitled "System and Method for Conducting the Closing of a Real Estate Sale Over a Computerized Network", filed 23 Feb. 2000.

FIELD OF THE INVENTION

The present invention relates to a computer method and system for conducting the closing of a real estate sale over a computerized network. More particularly, this invention relates to a system and method for electronically processing a real estate closing over a computerized network according to closing instructions that are generated from an electronic dialogue with the buyer and seller and stored in functional form in a database that is connected to the system.

BACKGROUND OF THE INVENTION

The sale of real estate generally consists of four distinct phases: first, the matching of a willing buyer with a willing seller; second, contract negotiation and execution; third, a due diligence period in which the contract contingencies are removed, and fourth, the settlement at which time the property changes ownership. The third and fourth phases are together referred to as the closing process.

The first phase of the process is rapidly automating. For example, since the 1980s, real estate agents in most communities have been able to perform computer-assisted searches of residential properties listed for sale with other realtors in the community through their local multiple listing service. Today, numerous Web sites provide consumers with the ability to use the Internet to advertise and search for advertisements of properties for sale throughout the United States. U.S. Pat. No. 5,664,115 covers a process that facilitates the matching of potential buyers and sellers of real estate by permitting automatic screening of potential buyers. U.S. Pat. No. 5,500,793 covers a computerized system to identify properties for possible exchanges.

Although the second phase of the process (contract generation and execution) has not yet been automated in practice, several patents have been issued in this area related to purchase contracts in general. (See, e.g., U.S. Pat. Nos. 5,191,613; 5,692,206; 5,794,207; and 5,970,470). On priceline.com, a consumer can make, and a vendor can accept, via the Internet the consumer's purchase offer for various goods and services. However, currently there is no known process or system that automates the third and fourth phases of the sale of real estate.

The Closing Process: Due Diligence and Settlement

In a typical real estate purchase agreement, the buyer's obligation to purchase, and the seller's obligation to sell, the property are contingent upon the satisfaction of several conditions. To the extent these conditions are eliminated before settlement, they are generally referred to as "contingencies". To the extent they are satisfied at or after settlement (such as in the case of transfer of title and issuance of a title insurance policy), they are generally referred to as "closing conditions."

Typically, there are two methods for removal of contingencies (thereby allowing the sale to go forward): the active method, in which the contingency is removed, for example, by notice from the buyer, and the passive method, in which it is removed by expiration of a deadline without notice. The following example is illustrative: Most sales of residential property are subject to a financing contingency. A financing contingency allows the buyer to cancel the sale if the buyer is unable to find a lender who will finance the buyer's acquisition of the property. If the financing contingency is to be removed by the passive method, then the buyer is deemed to have waived or removed the contingency (thereby allowing the sale to go forward) if the deadline expires without notice from the buyer. Conversely, if the financing contingency is to be removed by the active method, then the contingency is not removed (and the sale will not go forward) unless the buyer gives notice of its removal before the applicable deadline.

In a contract for the purchase of real estate, the contingencies generally include buyer's review and acceptance of a title insurance company's commitment to issue a policy of title insurance insuring the buyer's title to the property. Frequently, a financing contingency is also included. Finally, other contingencies such as various inspections of the property may also be included. The purchase contract generally assigns a deadline or expiration date for the satisfaction of each contingency and these deadlines will often differ.

When all of the contract contingencies are eliminated, the due diligence phase is complete and settlement may take place. At or before settlement, the seller executes and delivers to the closing agent certain documents including a deed conveying the property to the buyer; the buyer delivers or makes available to the closing agent the funds sufficient to pay the sale price and the buyer's share of closing costs. The cash to be paid to the seller is equal to the sale price less any loans assumed by the buyer and less any other agreed upon deductions such as the seller's share of closing costs. Prior to disbursement of the funds, the closing agent will prepare, and the buyer and seller may sign, a settlement statement itemizing the closing expenses and showing how the funds are disbursed. The buyer and other parties may also be required to execute certain documents at a formal closing meeting.

Settlement procedures vary on a state-by-state basis. In general, on the East Coast, at the closing meeting, the closing agent disburses the cash consideration to the seller and other parties involved in the sale, such as an existing lender whose loan is being paid off, real estate brokers, the title insurance company, and the closing agent itself. The deed is recorded in the county records immediately thereafter and any required title insurance may then issue. On the West Coast, the funds are disbursed only after the deed has been recorded.

Throughout the country, the current procedures for handling the due diligence and settlement phases are labor intensive, paper driven and prone to error. Although the purchase contract may be generated by a word processor and therefore in digital form, this digital form is not functional; that is, it is not linked to any computer readable rules or procedures for processing the agreed upon contingencies and closing conditions. As a result, in order to eliminate the contract contingencies, a human closing agent (or the parties themselves) must monitor the appropriate deadlines, review any notices from the appropriate parties and then take a further mental step of determining whether the contractual requirements for contingency elimination were met. Similarly, when title insurance is ordered, the parties (or a human closing agent) must review the contract to obtain the relevant information, such as the legal description of the property, the buyer and seller's legal names, the purchase amount and the closing date. If the contract is in digital form, certain time can be saved by cutting and pasting such information from the contract. But a human agent must do this work. Furthermore, when the various parties prepare the deed, the title policy, and other critical transaction documents, the relevant transaction information must be re-keyed or, at best, "cut and pasted" by a human agent. Moreover, the information necessary to prepare the settlement statement (e.g., sale price, balance on loans being assumed, title insurance premium, etc.) must be physically obtained and entered by the closing agent. Finally, because there are so many documents to prepare, review and execute at the closing meeting, the buyer, seller and one or more human closing agents generally must be physically present.

Digital Signatures

Any system that fully automates the closing process should provide a means for authenticating and keeping secure the electronic communications from the parties involved in the transaction. Public key cryptography, a commonly used method for authenticating and protecting such communications, uses two electronic keys, a public key and a private key, both of which are issued by a trusted third party. The private key is known only to the sending party, whereas the public key is publicly available. The keys are mathematically related such that a message decrypted with the public key could have been encrypted only with the private key. Therefore, if a sender signs a document with his private key, the recipient can use the sender's public key to confirm the authenticity of the document. For a comprehensive description of public key cryptography, see Warwick Ford and Michael S. Baum, "Secure Electronic Commerce: Building the Infrastructure for Digital Signatures and Encryption," Prentice-Hall, 1997, which is incorporated by reference herein.

In the United States, a contract for the sale of real estate is subject to the statute of frauds, which provides that the contract is invalid unless it is in writing and signed by the party against whom enforcement is sought. Over about the past five years, approximately half of the states have passed legislation that specifically authorizes the use of a digital signature in place of a physical signature, thereby satisfying the writing and signature requirement for real estate contracts imposed by the statute of frauds. In addition, many states now authorize the electronic recordation of deeds.

SUMMARY OF THE INVENTION

One object of this invention is to provide a system that accomplishes the electronic satisfaction of the contingencies and closing conditions of a real estate sale, thereby drastically reducing the necessity of human intervention in the closing process. Another object is to provide for the storage of critical transaction data in a database allowing for electronic generation of transaction documents, thereby eliminating the need to re-key transaction data by the various parties and vendors involved in the transaction. It is a further object of the invention to maintain and update the status of a real estate sale in electronic form accessible by the parties to the transaction at any time. Another object is to automate the workflow process for real estate closings to reduce the delays and inefficiencies caused by human error.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

The present invention is a closing system and method that enables the closing of a real estate sale over a computerized network without the intervention of a human closing agent. The closing system consists of a server (called the "closing server") that acts on behalf of a closing agent, and a network of the closing server and the computers of the buyer, seller, closing agent, closing agent's financial institution, and third party providers, such as the title insurance company and lender. In a preferred embodiment, this network is the Internet. The closing server includes a database, called the transaction database, that stores the closing instructions input by the buyer and seller and closing routines, to be executed by the closing server, that enable the closing system to close the sale in accordance with the closing instructions. The closing method consists of the closing server eliciting the closing instructions from the buyer and seller over a network, entering the closing instructions into a transaction database contained in the closing server's storage device and processing the closing in accordance with the closing instructions by applying a set of closing routines to the transaction database and over the network.

The buyer or seller initiate a closing by registering with the system and requesting initiation of a new transaction. The closing server then creates a new record in the transaction database, assigns it a unique number and sets the trust account balance for such transaction to zero. The buyer and seller are each in turn prompted to complete a closing questionnaire that sets forth all of the closing terms and conditions. Among other things, the closing questionnaire elicits the sale price, legal description of the property, closing date, and details about each contingency, including agreed upon means for electronic removal or disapproval and the deadline for removal or disapproval. Each field in the closing questionnaire is mapped to the appropriate field in the transaction database. When the buyer and seller have agreed upon and submitted the completed questionnaire to the closing server, the completed questionnaire serves as the closing instructions.

After the closing server receives the closing instructions, it runs the due diligence modules which determine whether the contingencies have been removed, allowing the sale to go forward, or whether the sale cancels due to disapproval of one or more contingencies. One of the due diligence modules enables the designated party to enter its contingency approval or disapproval over the network. As each contingency is approved, the closing server removes it by flagging it. If a contingency is properly disapproved, the closing server cancels the transaction. Another due diligence module periodically (for example, on a daily basis) checks to determine whether the deadline for any unflagged contingency has expired. If the applicable contingency is to be removed by the active method (meaning the sale cancels unless it is approved before expiration of the deadline), then upon expiration of its deadline the closing server cancels the sale. If the applicable contingency is to be removed by the passive method, then upon expiration of its deadline the closing server removes the contingency by flagging it.

If the closing instructions require that the buyer receive title insurance, then there will be title commitment contingencies that serve two functions. First, the transaction cannot go forward unless the title commitment contingencies are removed by approval of the parties in accordance with the closing instructions. Second, when the closing server removes the title commitment contingencies, it sets the requirements for the actual title insurance policy to match the appropriate fields of the title commitment that the parties have approved. As a result, removal of the title commitment contingencies is processed by separate subroutines and the closing questionnaire contains some limitations on the manner in which the contingencies may be removed.

The title insurance contingencies consist of at least two separate contingencies: delivery of the title commitment and approval of the title commitment by buyer. In some cases, as explained below, a third contingency is also created for the seller's correction of the title commitment. The contingency for delivery of the title commitment is removed by the active method and only by the closing server's actual receipt of the title commitment. The deadline field for the contingency for title commitment approval is initially blank. When the closing server receives the title commitment, the closing server enters the deadline for title commitment approval as the date that occurs a certain number of days (as specified in the closing instructions) after receipt of the title commitment. If the buyer approves of the title commitment, then this contingency is flagged and is removed.

If the closing instructions allow or require the seller to correct the buyer's disapproval of the title commitment, then the contingency for title commitment approval can be removed only by the passive method meaning buyer can disapprove only by giving notice of disapproval before the deadline. And in such case, buyer can disapprove the title commitment only by marking those title exceptions to which the buyer objects. In this way, the seller will be notified of those title exceptions that the seller may or must agree to remove. When the buyer disapproves the title commitment by marking certain title exceptions, then the closing server creates another contingency for seller's correction of the title commitment and sets the deadline to the date that occurs a certain number of days (as specified in the closing instructions) after receipt of buyer's disapproval. If the seller refuses to correct (disapproves) of the title commitment, the transaction cancels. If the seller agrees to correct (approves), the title commitment contingency is removed and the terms of the actual title policy at settlement must match the title commitment but excluding those title exceptions that the seller has agreed to correct.

If there are existing loans on the property, then during the due diligence phase, the closing server will send out requests to the existing lenders to determine the payoff amount, if the loan is to be paid off, or the balance as of the settlement date, if it is to be assumed.

After completion of the due diligence modules and assuming removal of all contingencies, the closing server runs the presettlement modules which enable generation and execution of the deed, generation and approval of an estimated settlement statement, receipt of loan funds (if applicable), and confirmation that the title insurance company is prepared to issue the title insurance policy matching the approved title commitment and conditioned only upon certain standard conditions that are electronically verifiable by the closing server.

Throughout the closing process the closing server is notified of any deposits to, or disbursements from, the closing agent's financial institution applicable to this transaction. The closing server adds all deposits to, and subtracts all disbursements from, the trust balance for this transaction. Prior to settlement, the closing server confirms that the trust account balance equals or exceeds the funds required to close. It then follows the applicable settlement procedure set forth in the closing instructions. If the closing instructions specify that disbursement is to precede deed recordation, then the closing server first sends a request to the closing company's financial institution to disburse the trust funds for this transaction in accordance with the settlement statement. Then it causes the deed to be recorded. If the seller has digitally signed and notarized the deed and if the county recorder accepts digital filings, then the closing server sends the deed electronically to the county recorder. Otherwise, it instructs the closing company to physically record the deed. Finally, the closing server requests the title insurance company to issue the title policy.

If disbursement is to follow recordation, then the closing server first causes the deed to be recorded. Only then does it order disbursement of the trust funds in accordance with the settlement statement. After disbursement of the funds and issuance of the title insurance policy, the closing is complete.

Viewing embodiments which practice the invention from the perspective of the claims, an additional summary can be provided. One embodiment of a method practicing the present invention includes registering digital identifications of parties to a real estate transaction, entering a plurality of agreed closing instructions including conditions, repeatedly receiving digital identifications and instructions to mark the conditions cleared, and closing the real estate transaction when all conditions have been cleared. One aspect of this embodiment is that the closing instructions may identify the party authorized to mark conditions cleared and the deadline for marking the condition as cleared. Another aspect of this method may include verifying that the authorized party is marking a condition as cleared and is doing so timely. An authorized party may extend a deadline for marking a condition as cleared. Closing may include causing a deed to be recorded, either by instructions for an agent to proceed in a traditional manner of notarization and physical recording, or by digital notarization and electronic recording.

An additional method practicing the present invention includes registering digital identifications of parties to a real estate transaction, entering a plurality of closing instructions, including a title insurance condition and a plurality of other conditions, repeatedly receiving digital identifications and instructions to mark conditions as cleared, and closing the real estate transaction when all conditions have been cleared. The aspects of this method may include specifying a form of title insurance and endorsements required, electronically receiving a title insurance commitment, electronically ordering a title insurance policy, and matching the terms of the electronically received title insurance commitment to the title insurance order. It also may include receiving consent from a buying party to exceptions to the electronic title insurance commitment, marking exceptions to the electronic title insurance commitment to which the buying party objects, indicating that the selling party will correct the marked exceptions, and marking a title insurance commitment condition as cleared. The title insurance condition may include a title policy condition and this method may include marking the title policy condition as cleared if conditions to issuance contained in the title insurance commitment do not include any conditions other than recordation of a deed conveying real property to the buying party, payment of a title insurance premium, payment of the purchase price and payment of a real property tax. This method may also include receiving an updated title insurance commitment including a set of updated exceptions, determining a set of permitted exceptions which consist of the exceptions in the title insurance commitment excluding the marked exceptions and marking the title policy condition as cleared if the set of updated exceptions is a subset of the set of permitted exceptions. Closing may include causing a deed to be recorded, either by instructions to proceed in a traditional manner of notarization and physical recording, or by digital notarization and electronic recording.

A further method practicing the present invention includes registering digital identifications of parties to a real estate transaction, entering a plurality of agreed closing conditions, comprising a plurality of conditions and one or more passive conditions having corresponding deadlines, wherein the passive conditions are satisfied by the passage of time unless further steps are taken, and closing the real estate transaction when all of the conditions have been marked as cleared. One aspect of this method may be that a passive condition is cleared when the corresponding passive condition deadline has passed. It further may include receiving digital identifications and instructions from one of parties before passive condition deadlines have passed and creating an additional condition. The closing step may include causing a deed to be recorded, either manually or electronically.

The present invention also may include registering digital identifications of parties to a real estate transaction, entering agreed closing instructions, including a plurality of conditions, establishing an electronically accessible trust account, repeatedly receiving digital identifications and instructions to mark conditions cleared, and receiving and disbursing funds from the electronically accessible trust account to settle accounts at the closing. This method may include causing a deed to be recorded, either manually or electronically. One aspect of this method may be that the closing instructions include the name and contact information for an existing lender and an instruction to payoff or assume an existing loan owed by a seller to the existing lender; this aspect includes electronically sending the existing lender a request for payoff or balance information for the existing loan, electronically receiving from the existing lender a response to the request for payoff or balance information for the existing loan specifying an amount of money due, debiting the seller for the amount of money due and in the case of an instruction to payoff the existing loan, disbursing to the existing lender at closing funds equal to the amount of money due or in the case of an instruction to assume the existing loan, crediting the buyer for the amount of money due.

An interface for inputting closing conditions, in accordance with the present invention, may comprise a closing server in communication with a browser client, and a database a browser-presented list of selectable standard closing conditions, and a browser-presented template of components to create custom closing conditions, wherein the closing server includes resources and logic to map the closing conditions to corresponding fields in the database. The components to create custom conditions may include a condition, the identity of the party authorized to clear the condition, a deadline for clearing and classification of the condition as either active or passive, a passive condition being one which is satisfied by the passage of time unless approved and an active condition being one which is satisfied only by approval before its deadline. The closing server may include logic and resources to verify the identity of the parties and document their consent to the real estate transaction. This browser may be connected with the server through the Internet. The list of selectable standard conditions may include logic to ask follow-up questions based on selection of a particular standard condition. This interface may include a browser-presented list of geographic property locations and property types mapped to appropriate standard conditions. The database may contain names of one or more title insurance companies and names and terms of one or more types of title insurance policies issued by such title insurance companies in which case the closing server will include logic to select one of the title insurance companies and one of the types of title insurance policies. The database may also contain the names of one or more lenders and contact information for such lenders in which case the closing server will contain logic to select one of such lenders.

An additional interface for clearing closing conditions may include a closing server in communication with a browser client, a browser-presented list of closing conditions, and a template linked to an applicable closing condition, including options for approval or disapproval, wherein the closing server includes resources and logic to authenticate the user and respond to an approval or disapprove. This interface may display legally binding descriptions associated with the options to approve or disapproval. The list of conditions displayed may include only those closing conditions which the user is responsible to approve or disapprove. The closing server and browser client may use public key cryptography for party identification. The interface may further include a list of deadlines for disapproval, the server including resources and logic to compare these deadlines with the time/date stamps of disapprovals.

A further interface for amending closing conditions may practice the present invention. It may include a closing server in communication with a browser client and a database, a list of applicable closing conditions, a template of components for a first user to propose an amendment, and a template of options for a second user to approve or disapprove of the proposed amendment, wherein the closing server includes resources and logic to authenticate the users and carry out the amendment by mutual consent.

BRIEF DESCRIPTION OF THE DRAWINGS

FIG. 1A illustrates a preferred embodiment of a system, according to the invention.

FIGS. 2A-2E are a flow diagram of the entire closing process executed by the system shown in FIG. 1A.

FIG. 3 is a flow diagram of a subroutine executed by the system shown in FIG. 1A that enables parties to a contemplated real estate sale to generate closing instructions which are stored in functional form in the transaction database.

FIG. 4 is a flow diagram of a routine executed by the system shown in FIG. 1A that maintains trust account balances.

FIG. 5 is a flow diagram of a subroutine executed by the system shown in FIG. 1A that enables the ordering and receipt of the title commitment in accordance with the closing instructions.

FIGS. 8A-8B are a flow diagram of a subroutine executed by the system shown in FIG. 1A that determines whether the contingencies to the sale have been removed.

FIG. 9 is a flow diagram of a subroutine executed by the system shown in FIG. 1A that determines whether the parties have approved the title commitment.

FIG. 15 is a flow diagram of a subroutine executed by the system shown in FIG. 1A that determines whether the title insurance closing condition has been satisfied.

FIG. 16 is a printout of a sample questionnaire that enables the buyer and seller to input the closing instructions for sale of land in California in functional form.

DETAILED DESCRIPTION OF THE INVENTION

System Architecture

Figure 1B:
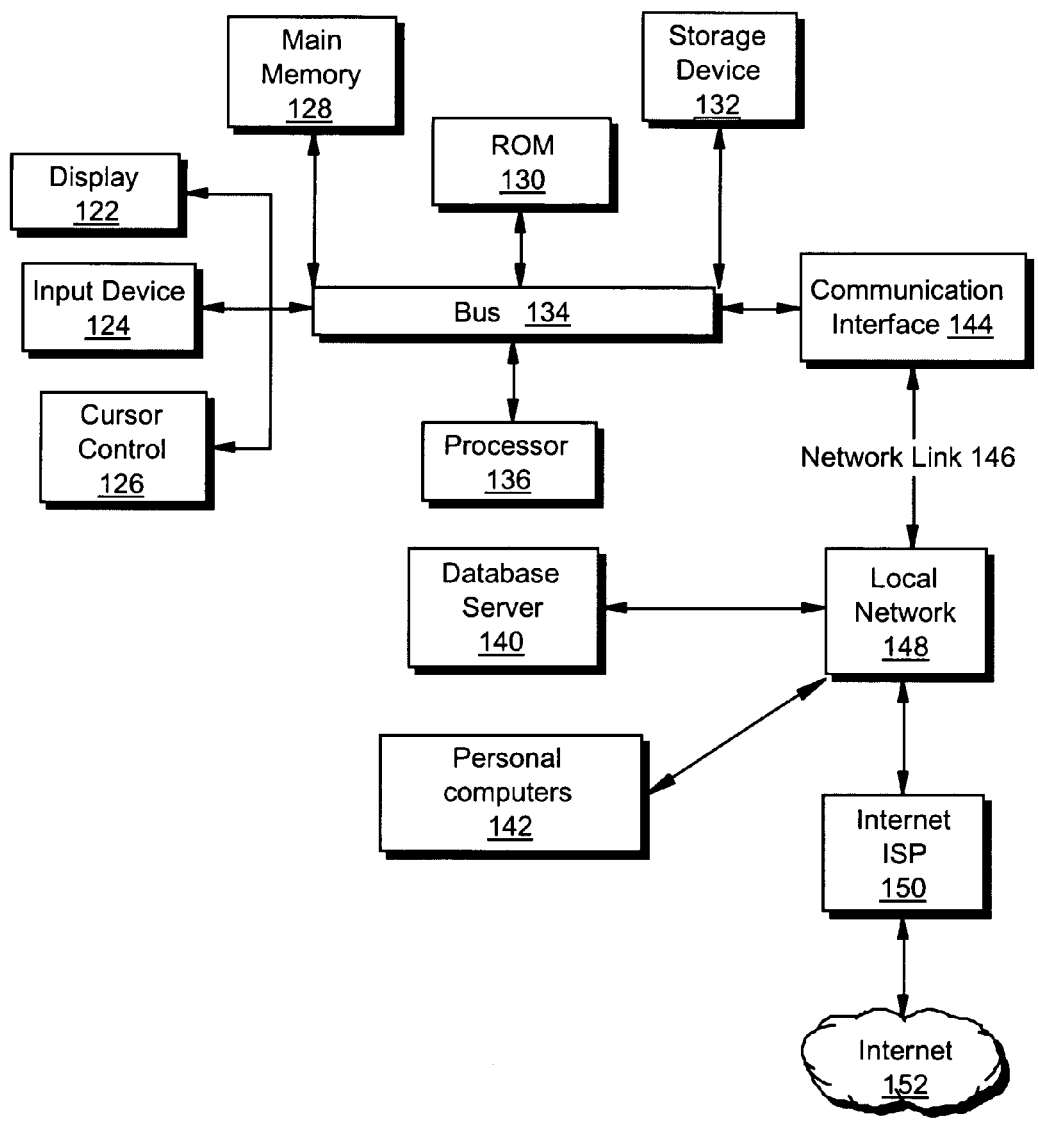
FIG. 1B is a block diagram illustrating the hardware elements of the closing server in an embodiment of the present invention.

FIG. 1A shows one embodiment of the system 100 according to the invention. In this embodiment, the system includes closing server 102 and the computer systems of the buyer 106, seller 104, closing agent 108, title company 116, lender 114, the financial institution that holds the closing agent's trust funds 110, other service provider 112, and one or more counties 118. All such users are connected to the Internet 120 using conventional means and to each other through the Internet.

FIG. 1B is a block diagram that illustrates one embodiment of the closing server 102 used in the system shown in FIG. 1A. Closing server 102 includes a bus 134 or other communication mechanism for communicating information, and a processor 136 coupled with bus 134 for processing information. Closing server 102 also includes a main memory 128, such as a random access memory (RAM) or other dynamic storage device, coupled to bus 134 for storing information and instructions to be executed by processor 136. Main memory 128 also may be used for storing temporary variable or other intermediate information during execution of instructions to be executed by processor 136. Closing server 102 further includes a read only memory (ROM) 130 or other static storage device coupled to bus 134 for storing static information and instructions for processor 136. Closing server 102 may be coupled via bus 134 to a display 122, such as a cathode ray tube (CRT), for displaying information to an operator. An input device 124, including alphanumeric and other keys, is coupled to bus 134 for communicating information and command selections to processor 136. Another-type of user input device is cursor control 126, such as a mouse, a track ball, or cursor direction keys for communicating direction information and command selections to processor 136 and for controlling cursor movement on display 122. A storage device 132, such as a magnetic disk or optical disk, is provided and coupled to bus 134 for storing the transaction database, the closing questionnaire database, and the program code required to execute the processes described herein.

The invention is related to the use of closing server 102 in system 100 for conducting online real estate closings. According to one embodiment of the invention, closing server 102 conducts an online closing through system 100 by receiving inputs from the communication interface 144 and processing such inputs in response to processor 136 executing one or more sequences of one or more instructions contained in main memory 128. Such instructions may be read into main memory 128 from another computer-readable medium, such as storage device 132. Execution of the sequences of instructions contained in main memory 128 causes processor 136 to perform the process steps described herein. One or more processors in a multi-processing arrangement may also be employed to execute the sequences of instructions contained in main memory 128.

The term "computer-readable medium" as used herein refers to any medium that participates in providing instructions to processor 136 for execution. Such a medium may take many forms, including, but not limited to, non-volatile media, volatile media, and transmission media. Non-volatile media include, for example, optical-or magnetic disks, such as storage device 132. Volatile media include dynamic memory, such as main memory 128. Transmission media include coaxial cables, copper wire, and fiber optics, including the wires that comprise bus 134. Transmission media can also take the form of acoustic or light waves, such as those generated during radio frequency (RF) and infrared (IR) data communications. Common forms of computer-readable media include, for example, floppy disk, a flexible disk, hard disk; magnetic tape, any other magnetic medium, a CD-ROM, DVD, any other optical medium, a RAM, a PROM, an EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 136 for execution. For example, the instructions may initially be borne on a magnetic disk of a remote computer. The remote-computer can load the instructions into its dynamic memory and send the instructions over a telephone line using a modem. A modem can receive the data on the telephone line and use an infrared transmitter to convert the data to an infrared signal. An infrared detector coupled to bus 134 can receive the data carried in the infrared signal and place the data on bus 134. Bus 134 carries the data to main memory 128, from which processor 136 retrieves and executes the instructions. The instructions received by main memory 128 may optionally be stored on storage device 132 either before or after execution by processor 136.

Closing server 102 also includes a communication interface 144 coupled to bus 134. Communication interface 144 provides a two-way data communication coupling to a network link 146 that is connected to a Local Network 148. Such local network 148 is connected to one or more personal computers 142 and a database server 140. For example, communication interface 144 may be an integrated services digital network (ISDN) card or a modem to provide a data communication connection to a corresponding type of telephone line. As another example, communication interface 144 may be a local area network (LAN) card to provide a data communication connection to a compatible LAN. Wireless links may also be implemented. In any such implementation, communication interface 144 sends and receives electrical, electromagnetic, or optical signals that carry digital data streams representing various type of information. Network Link 146 typically provides data communication through one or more networks to other data devices. For example, Network Link 146 may provide a connection through Local Network 148 to data equipment operated by an Internet Service Provider (ISP) 150. ISP 150 in turn provides data communication services through the Internet 152.

Closing server 102 can send messages and receive data through the network(s), network link 146, and communication interface 144.

Figure 1C:
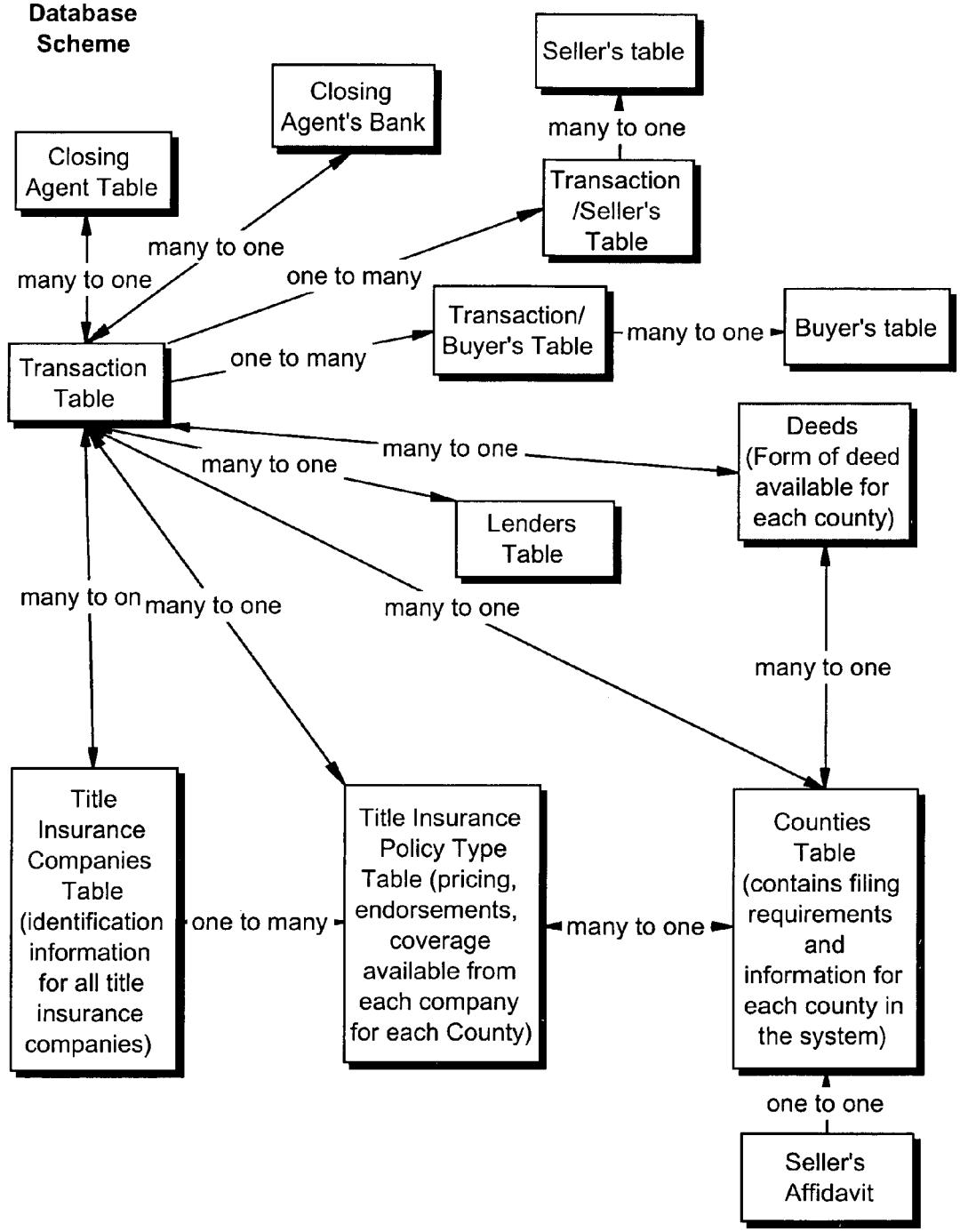
FIG. 1C is a block diagram showing the transaction database stored in the closing server.

An embodiment of the transaction database is illustrated in FIG. 1C. The tables for the buyer, seller, closing agent and closing agent's bank each contain identifying information about such entity such as legal name, address and public key information. The lender table contains information about each lender that is associated with the system. This table contains lender records having fields corresponding to, for example, lender ID, lender name and contact information.

The county table contains information about each county that is covered by the system. The county table contains records having fields corresponding to, for example, county ID, county name, state, whether the county allows digital deeds to be sent for recordation, address of the location in the county for recording deeds. The deeds table contains the format for various types of deeds in appropriate form for recordation and for conveying fee simple title to property in a given county.

The title insurance company table contains information about each title insurance company that is registered with the system. This table contains title insurance company records having fields corresponding to, for example, title insurance company ID, name, address, the title company's transmission specifications, and the identity of the Certification Authority that has issued the Title Company its public key. The title policy type table contains information about various title policies available from a given title insurance company in a given county. This table contains records having fields corresponding to, for example, a title policy ID; title insurance company ID (mapped to the appropriate title insurance company in the title insurance company table); county ID (mapped to the appropriate county in the county table); name of policy type; base cost in dollars per thousand dollars of coverage, list of available endorsements by name, text of endorsement language, and cost; and the text of the general terms and conditions of the policy. The data in the title insurance company and title policy type tables are provided and updated by title insurance companies that have registered with the system 100.

The closing questionnaire database is contained in storage device 132. It includes fields for the text of each closing question, mapping information that maps the response to such question to the appropriate field in the transaction database, the type of property to which such question applies and the location (by State) of the property to which such question applies.

System Operation

The various components of system 100 operate to conduct a real estate closing over a computerized network. FIGS. 2-15 are flowcharts showing the operation of a closing according to the preferred embodiment. The steps shown in FIGS. 2-15 are performed by various components of system 100. More detailed descriptions of various elements of the flowcharts and the components that perform the described steps are provided below.

Connecting to the System

In the preferred embodiment, communication among buyer, seller, closing server and the other parties to the transaction is completed using the Internet. A World Wide Web page provides the interface for a user to access the system. A potential user accesses the Internet using any standard Web browser. FIGS. 2A-2E shows the main routine for a user who accesses the system and initiates and closes a new transaction. At step 200 in FIG. 2A, a user accesses the system via the user's web browser. The user is then presented with the choice of logging in (if already registered) or registering. If the user is registering, the closing server proceeds to step 1110 in FIG. 11. If the user is "logging in", the closing server continues to step 204.

An existing user "logs in" in the conventional manner by entering his or her name and password or presenting his or her digital signature. The name and password are encrypted using SSL or a similar security method. After the log in, if the user has an existing transaction, the user may either choose to access an existing transaction or begin a new one 204. If the user chooses to work on an existing transaction, the closing server proceeds to step 206. If the user chooses to work on a new transaction, the closing server continues to step 212.

At step 206, the user is prompted to enter the transaction ID number of the existing transaction. Upon receipt of such ID number, the closing server accesses the transaction database to determine whether the user is already associated with such transaction. If the user is not associated with such transaction, the closing server proceeds to step 1140 in FIG. 11. Otherwise, it continues to step 210 where it presents the user with the schedule for the applicable transaction together with a list of open items to be acted on by the user. If the user takes further action, the closing server follows the applicable routines set forth herein. Otherwise it ends the routine at step 211.

At step 212, the user initiates a new transaction by completing various fields presented via the user's web browser, such as the names of the buyer and seller, the county and state where the property is located, and the type of property (i.e. land, commercial property or residential property). The closing server then creates a new transaction record, assigns it a unique transaction ID number and sets the trust account field of the transaction record to zero 214. At step 216, the closing server runs the steps outlined in the closing instructions module shown in FIG. 3.

Inputting the Closing Instructions

FIG. 3 shows the process of conducting an electronic dialogue with each of the parties to obtain the closing instructions in functional form. At step 300, the closing server accesses the closing questionnaire database and presents a questionnaire relating to the terms and conditions of the transaction. In the preferred embodiment the closing server elicits from the first party the type of property (e.g., land, single family home, condo, apartment building or commercial building). In such embodiment, the closing questionnaire database contains closing questions appropriate for each type of property and for each state covered by the system. An example of such a questionnaire applicable to the sale of land in California is shown in FIG. 16.

In the preferred embodiment, the parties will be presented with the choices of various closing provisions commonly used for the type of property (i.e., commercial, single family, multi-family, or land) in the state in which the property is located.

As shown in FIG. 16, in the preferred embodiment, the questionnaire elicits from the parties the contingencies and the closing conditions of the sale. When agreed upon by both parties, the completed closing questionnaire will serve as closing instructions to the closing agent. Each response field in the closing questionnaire is mapped to the appropriate field in the transaction database. With respect to the contingencies, the parties must specify which person may give notice of approval or disapproval and the form of such notice. The parties are given three choices: (1) a specific communication from the buyer, (2) a specific communication from the seller, or (3) a specific communication from a designated third party.

In the preferred embodiment, all such communications are authenticated by use of the sender's digital signature using public key cryptography. The parties must also specify whether the contingency is to be removed by the passive or active method. These methods establish whether the sale goes forward or cancels when a deadline expires without approval or disapproval of the contingency.

As further shown in FIG. 16, in the preferred embodiment if the parties agree that closing is conditioned upon the issuance of a title insurance policy then the parties are further questioned about the detailed parameters (or specifications) for such title insurance policy. The title insurance parameters to be specified by the parties are as follows: (i) the identity of the title insurance company (ii) the form of title insurance (iii) the nature of any endorsements and (iv) the provisions for determining the permitted exceptions to title. The closing server determines the remaining title parameters by mapping the following closing terms onto the following parameters: the closing date onto the effective date of the policy, the name of the buyer onto the name of the insured, the estate being acquired onto the estate being insured, the purchase price onto the insured amount, and the legal description of the property onto the legal description of the estate being insured.

If the parties wish to add additional contractual provisions for which the closing agent need not be concerned, they may do so in the last question on the questionnaire. For example, in many real estate contracts, the buyer requires that the seller make certain representations and warranties about the condition of the property and the contract may provide for arbitration or other dispute resolution mechanisms. So long as these provisions are prefaced with the qualification that they do not affect the closing agent's duties or obligation, any such provision may be entered in this field. Since these provisions need not be functional, they are mapped to a field in the transaction database, which is used only for display and amendment purposes, and which does not otherwise affect any of the closing routines.

Returning to FIG. 3, at step 310 the user completes the closing questionnaire and transmits it to the closing server. In the preferred embodiment, users will digitally sign certain transmissions (such as this one) and such digital signatures will be encrypted, decrypted and authenticated by use of public key cryptography.

At step 320, the closing server enters each response to the closing questionnaire into the applicable field in the transaction database by applying the mapping specified in the closing questionnaire database, and the closing server then notifies the other party to the transaction via email or other means of communication that the completed closing questionnaire has been submitted to the system and is available for review. This notification will contain the transaction identification number.

Figure 11:
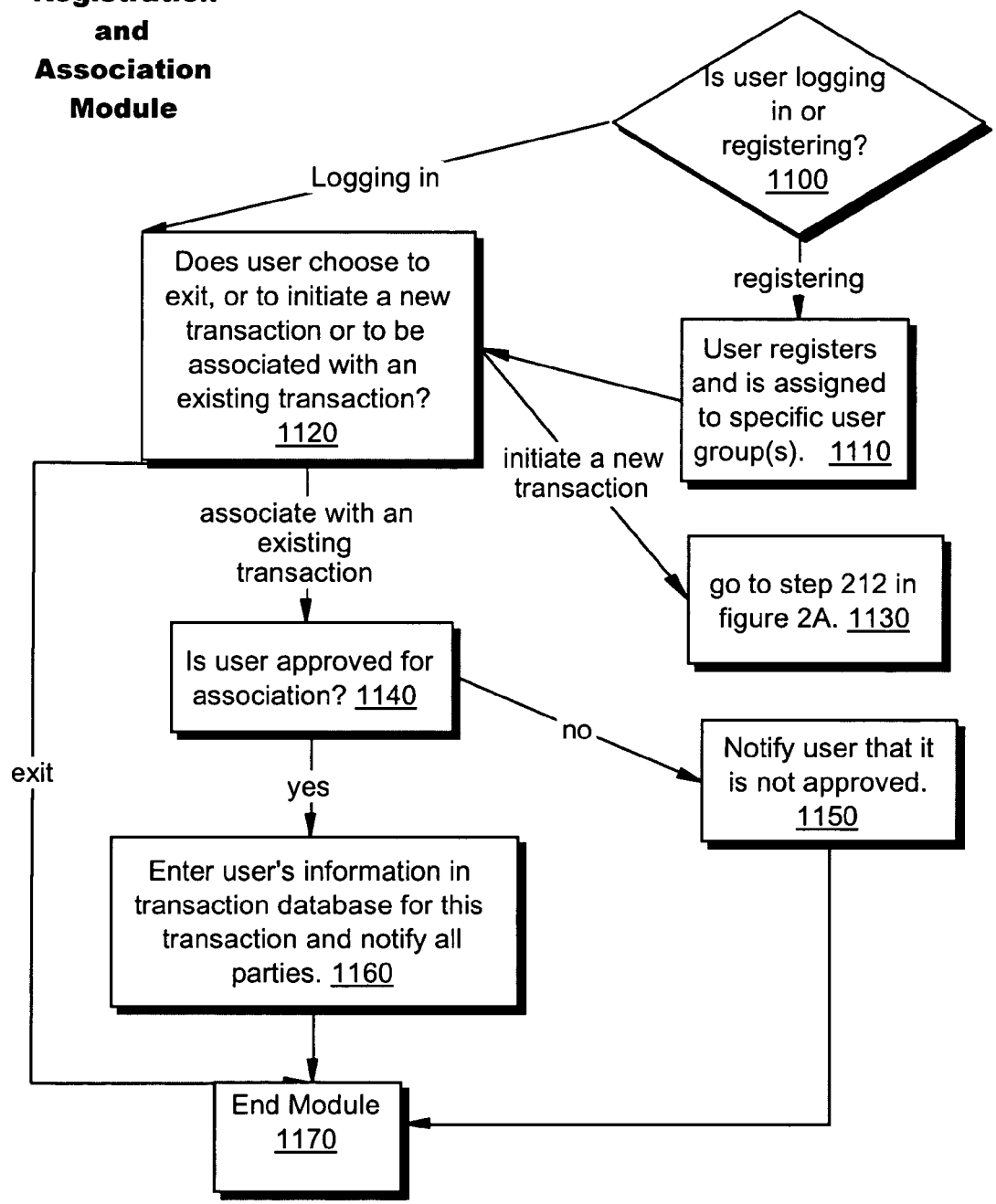
FIG. 11 is a flow diagram of a subroutine executed by the system shown in FIG. 1A that enables users to register with the system and be associated with a particular transaction.
Figure 12:
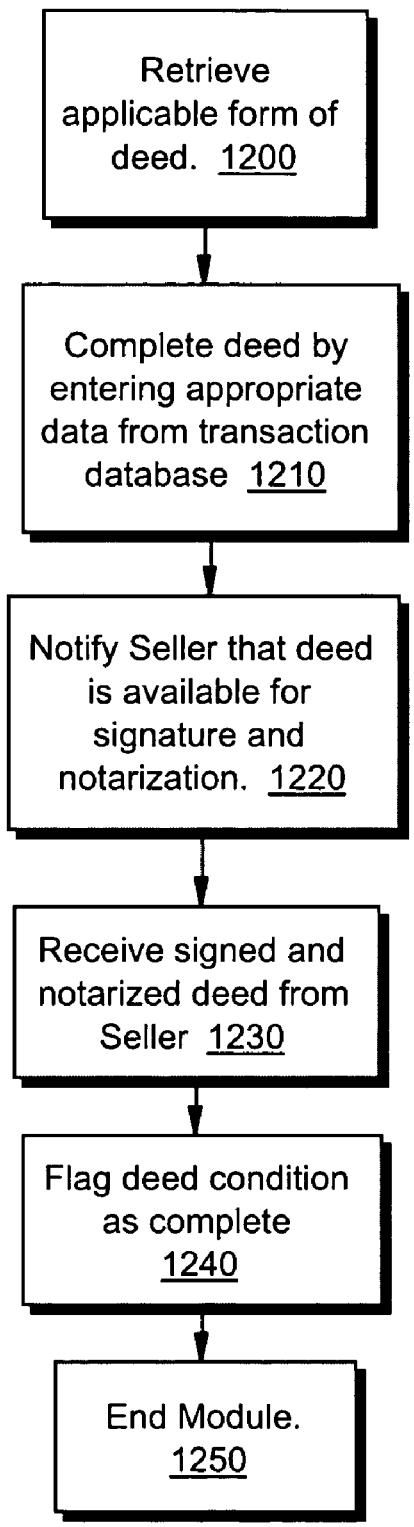
FIG. 12 is a flow diagram of a subroutine executed by the system shown in FIG. 1A that enables the deed to be generated, executed and notarized by digital means.

At step 330, the other party registers with the system as described in Step 1110, FIG. 11, or logs in if it has already registered. Such party then accesses the transaction by entering the transaction identification number. The closing server will then transmit the completed closing questionnaire to such party who has three basic choices: it can cancel the transaction, it can approve without any changes by digitally signing and submitting the closing questionnaire, or it can modify any of the answers to the same extent as could the first party. Modification requires both parties' digital signature. If the other party cancels the transaction, then the closing server notifies the first party of the cancellation 350. If the second party approves without changes, then the closing server continues to step 340.

If the second party wishes to modify the closing instructions, the closing server returns to step 300 and presents the closing questionnaire as currently completed. At step 310, such party may now modify any of the existing responses. The process continues until both parties approve all responses in the closing questionnaire or one party cancels the transaction.

At step 340, the closing server locks the closing instructions, assigns appropriate buyer/seller and third party accesses and notifies the parties. No party will have the ability to modify the closing instructions unilaterally. The closing instructions may only be modified after both parties have agreed to an amendment as described in FIG. 10. In the preferred embodiment, access privileges are determined by the user group to which the party has been assigned during the registration process as described in FIG. 11. For example, in the preferred embodiment a title company associated with a particular transaction can view all fields related to the buyer, seller, title order and title commitment and can modify the title commitment fields until they are locked. The module ends at step 360.

Following the completion of the closing instructions module, the closing server returns to the main routine at step 218 and creates a schedule. The schedule displays the name of each contingency and closing condition, its deadline and the name of the responsible party or parties. As each item is completed, the closing server will replace the deadline with a checkmark signifying completion.

Figure 10:
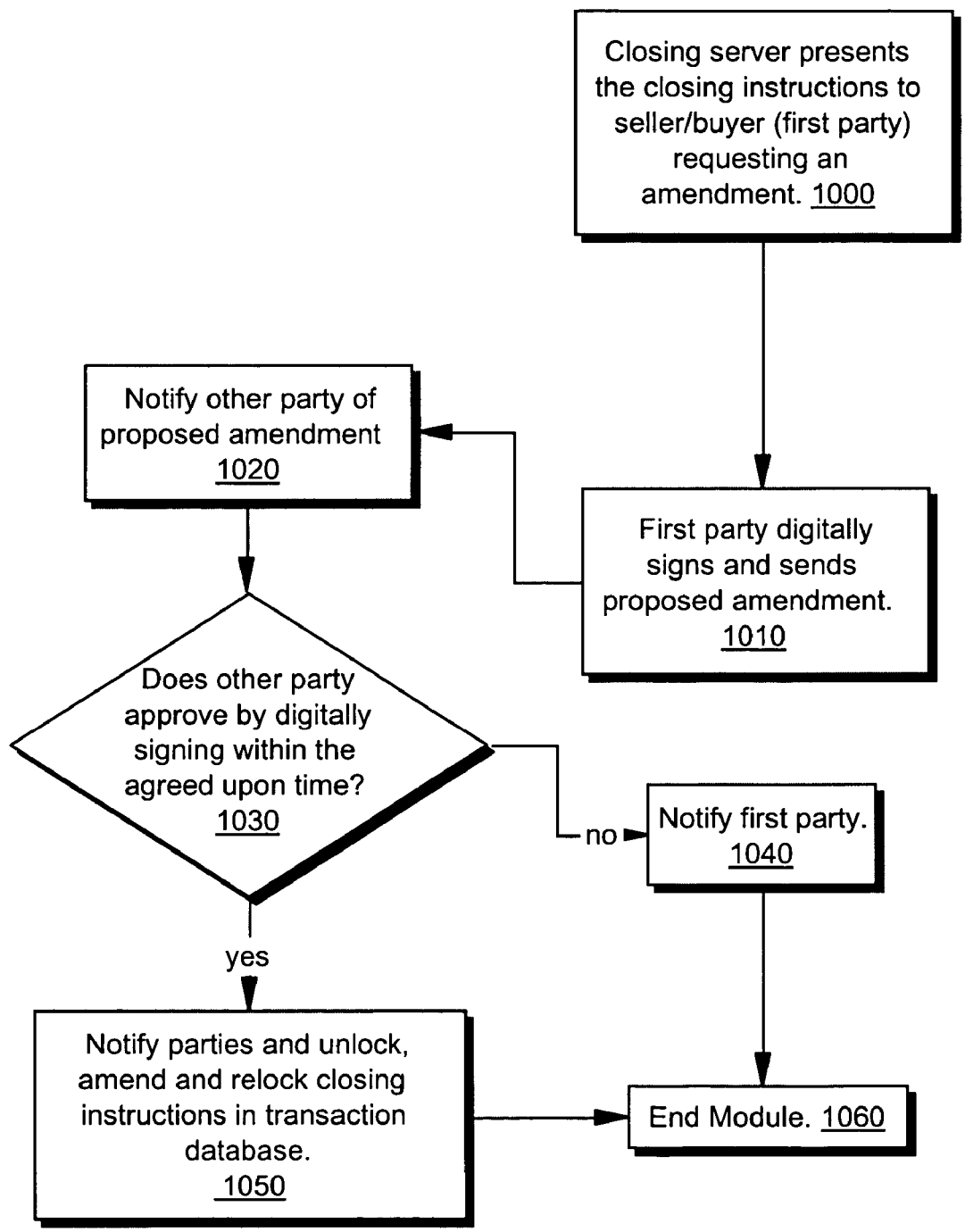
FIG. 10 is a flow diagram of a subroutine executed by the system shown in FIG. 1A that enables the parties to amend the closing instructions.

At step 220, the closing server checks to determine whether the closing deadline (if any is set forth in the closing instructions) has expired. If the deadline has expired, it proceeds to step 222. Otherwise it continues to step 224. At step 222, the closing server sends buyer and seller notice of cancellation together with the procedure for amendment of closing instructions to extend the closing deadline. (In all cases herein where the closing server sends notice of cancellation, it will mark such transaction record as canceled and will cease running any closing routines (other than the amendment routine) for such transaction unless within a specific time period the parties amend the closing instructions to revive the transaction.). The subroutine for amendment is shown in FIG. 10.

Due Diligence

At step 224 the closing server concurrently runs all applicable due diligence modules: Delivery of Title Commitment (FIG. 5), Existing Loans (FIG. 6), Contingency Deadlines (FIG. 7), Active Contingency Removal (FIG. 8).

Assuming that the buyer has required the issuance of a title insurance policy as a closing condition, the closing server will run the Delivery of Title Commitment Module [see FIG. 5] concurrently with the other applicable due diligence modules 226. At step 500, when the closing server has received the parties' selection of the title insurance company, the closing server associates the title insurance company with this transaction. In the preferred embodiment, the parties are prompted in the closing questionnaire to select a title insurance company that has already registered with the system. If the chosen title insurance company is already listed in the title insurance company table in the transaction database, the closing server associates the title company with the transaction by entering the title insurance company's identification number into the record for this transaction in the transaction database. If the title insurance company is not yet listed in the title insurance company table, the closing server will notify the parties that the title insurance company cannot be associated with this transaction until it registers and enters the required information into the transaction database. The steps for registration are set forth in FIG. 11. In an alternative embodiment, the parties are permitted to specify which of them will designate the title company. Thereafter, the closing server will accept the title company designation only from the party specified in the closing instructions as having the right of selection and such designation may be changed only be amendment as described in FIG. 10.

At step 510, the Closing Server generates the title order and transmits it to the title insurance company. The Closing Server creates the title order in the form of a view of the following entries from the transaction database: the transaction identification number and the following title insurance parameters: title insurance company name, named insured, policy type, legal description, endorsements, named insured, and policy amount. The Closing Server transmits the title order to the title insurance company per the transmission specifications applicable to such title insurance company as set forth in the title insurance company table. For example, the title insurance company may specify that title orders are to be sent in the form of XML documents, by EDI or by facsimile. If XML is specified, each of the title order parameters are separately tagged. If EDI is specified the title order is translated into EDI format per the applicable EDI standard specified by the title insurance company. If more than one method is specified, in the preferred embodiment, the Closing Server will choose XML over EDI and EDI over facsimile.

At step 520, the closing server receives the title commitment from the title insurance company. Receipt of the title insurance commitment triggers the closing server to translate it out of the title company's format and enter it into the transaction database. If the title commitment is sent by facsimile, a human operator must manually enter the data into the appropriate fields of the transaction database.

At step 530, the Closing Server compares the parameters in the title order to the corresponding parameters in the title commitment. If they match, it continues to Step 550. Otherwise, it proceeds to Step 540. At Step 540, it notifies the parties of the discrepancy. At Step 550, the closing server flags the Delivery of Title Commitment contingency as complete and sends notification to the parties. At Step 560, the Closing Server sets the deadline for the Buyer's approval or disapproval of the title commitment, the agreed upon (as specified in the closing instructions) number of days after receipt of the title commitment. At Step 570, this module is complete and the Closing Server returns to Step 234 in the main routine.

The closing server then checks the transaction database to determine whether all due diligence modules are complete. If they are, it continues to step 242 in FIG. 2C. Otherwise, it proceeds to step 236 in FIG. 2B. At step 236, it waits a prescribed period and then returns to step 220. At step 220, the closing server checks to determine whether the closing deadline (if any is set forth in the closing instructions) has expired. If the deadline has expired, it proceeds to step 222. Otherwise it continues to step 224.

Figure 8B:
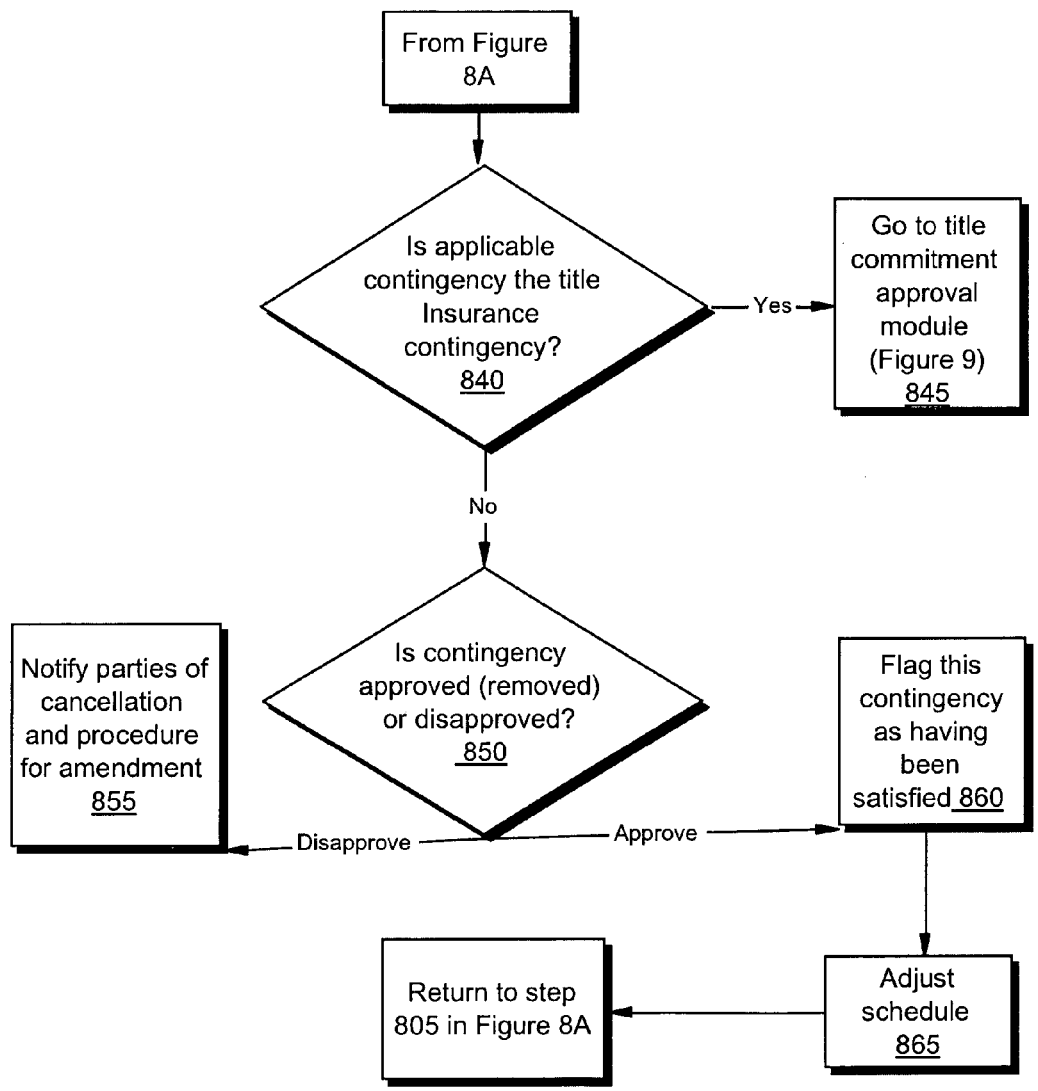

At step 224, the closing server checks for incomplete due diligence modules. At step 228, the closing server runs the active contingency removal module, FIGS. 8A-8B, concurrently with all other applicable due diligence modules. FIGS. 8A and B outline the steps to be taken to enable the system to remove a contingency or to cancel the transaction upon receipt of the applicable approval or disapproval. At step 800, a user who has registered with the system and been associated with a particular transaction clicks on a button appearing on the user's web browser that calls for a list of outstanding contingencies for which the user is responsible. At step 805, the closing server accesses the transaction database for this transaction to determine whether there any unflagged contingencies to be acted on by the user. If there are none, the closing server proceeds to step 810. Otherwise, it continues to step 815.

At step 810 the closing server determines whether there are any remaining unflagged contingencies. If there are none, it continues to step 820, flags the active contingency removal module as complete, and then ends the module at step 870. Otherwise, it continues directly to step 870 and ends the module without flagging it as complete. If the module ends but is not complete, the closing server will be triggered to rerun this module whenever a user calls for a list of outstanding contingencies for this transaction.

At step 815, the closing server retrieves from the transaction database a list of contingencies to be acted on by the user. The closing server makes this list available for viewing by the user on the user's web browser 825. For each contingency to be acted on by the user, the closing server associates with each such contingency a file containing the prescribed text for approval and for disapproval, each of which is associated with an approval and disapproval button, respectively. The user then can signify his or her approval or disapproval by clicking on the appropriate button on the user's web browser. At step 830, the closing server receives the user's contingency approval or disapproval, authenticates it by public key cryptography and determines whether it is timely by comparing the current date to the applicable deadline for such contingency. If it is authentic and timely it proceeds to step 840. Otherwise, the closing server proceeds to step 835 and notifies the user who submitted such approval or disapproval that it has been rejected.

At step 840, if the contingency being approved or disapproved is the buyer's title insurance contingency, then at step 845 the closing server continues to the title commitment approval subroutine shown in FIG. 9. Otherwise, the closing server continues to step 850.

At step 850, the closing server determines whether the contingency is being approved (removed) or disapproved. If it is being disapproved it continues to step 855. Otherwise it continues to step 860. At step 855 upon disapproval, the closing server notifies the parties that the contract is being canceled and notifies them of the procedure for amendment. If the contingency is being approved then at step 860 the closing server flags this contingency as complete in the transaction database. Next the closing server adjusts the schedule to show completion of such contingency 865. The closing server then returns to step 805 and recommences the subroutine.

FIG. 9 shows the steps to be followed in a subroutine that applies the rules prescribed in the closing instructions for approval or disapproval of the buyer's title commitment. Depending on the rules set forth in the closing instructions, title commitment approval consists of either one or two contingencies: in all cases, approval or disapproval will first be determined by the buyer, but if the closing instructions permit (or require) the seller to correct the buyer's disapproval of the title commitment, then there will be a second contingency for seller's approval or disapproval. Approval by seller means that the seller has agreed to correct all of buyer's objections to the title commitment. Disapproval by seller means that seller has not agreed to correct all of buyer's objections to the title commitment.

If the closing instructions allow or require the seller to correct the buyer's disapproval of the title commitment, then the contingency for title commitment approval can be removed only by the passive method meaning buyer can disapprove only by giving notice of disapproval before the deadline. And in such case, buyer can disapprove the title commitment only by marking those title exceptions to which the buyer objects. In the preferred embodiment, if the buyer makes such objections, the closing server marks an objection field associated with the applicable title exception and notifies the seller of such objections. In this way, the seller will be notified of those title exceptions that the seller may or must agree to remove. When the buyer disapproves the title commitment by marking certain title exceptions, then the closing server creates the contingency for seller's correction of the title commitment and sets the deadline to the date that occurs a certain number of days (as specified in the closing instructions (see FIG. 16, #5(b)(v)) after receipt of buyer's disapproval. The seller then may indicate its agreement to correct some or all of the objected to exceptions to title. The closing server then flags a field corresponding to each applicable title exception. Such flag signifies seller's agreement to correct (that is, remove) such title exception. If seller has agreed to correct all title exceptions to which buyer has objected, then seller will be considered to have approved of the title commitment.

At step 900, the closing server determines whether the party (either buyer or seller) is sending an approval or a disapproval. If it is an approval, the closing server proceeds to step 910. If it is a disapproval, it continues to step 920.

At step 910 it flags the applicable contingency as complete. In the preferred embodiment, if the party sending approval is the buyer, the closing server flags as complete the field for buyer's approval of the title commitment; if the party sending approval is the seller, the closing server flags as complete the field for seller's approval of the title commitment. After flagging the applicable contingency, the closing server sets the permitted exceptions to title to be equal to the exceptions to title shown in the title commitment, but excluding those (if any) that the seller has agreed to correct. In the preferred embodiment, the closing server accomplishes this by copying the applicable title exceptions into a separate field called permitted exceptions to title. The permitted exceptions to title are then locked and may not be modified except by amendment of the closing instructions as shown in FIG. 10. Following step 910, the closing server continues to 960 and returns to step 865 in FIG. 8.

At step 920, the closing server determines whether the party sending its approval or disapproval is the buyer or the seller. If it is the buyer the closing server continues to step 930. If it is the seller, it proceeds to step 940.

At step 930, the closing server accesses the transaction database to determine whether, according to the closing instructions, the seller has the right or obligation to remove any of the objected to exceptions. If the seller has such right or obligation, then the closing server continues to step 950. Otherwise, it proceeds to step 940. At step 940, the closing server notifies the parties of cancellation and the procedure for amendment. At step 950 since the seller (in this case) has the right or obligation to correct any objections to title, the closing server flags the buyer's approval of the title commitment as complete and creates a new contingency for the seller's correction of the title commitment. The closing server sets the deadline for the seller agreeing to correct according to the number of days specified in the closing instructions after receipt of the buyer's disapproval. The closing server then continues to step 960 and returns to step 865 in FIG. 8.

Figure 7:
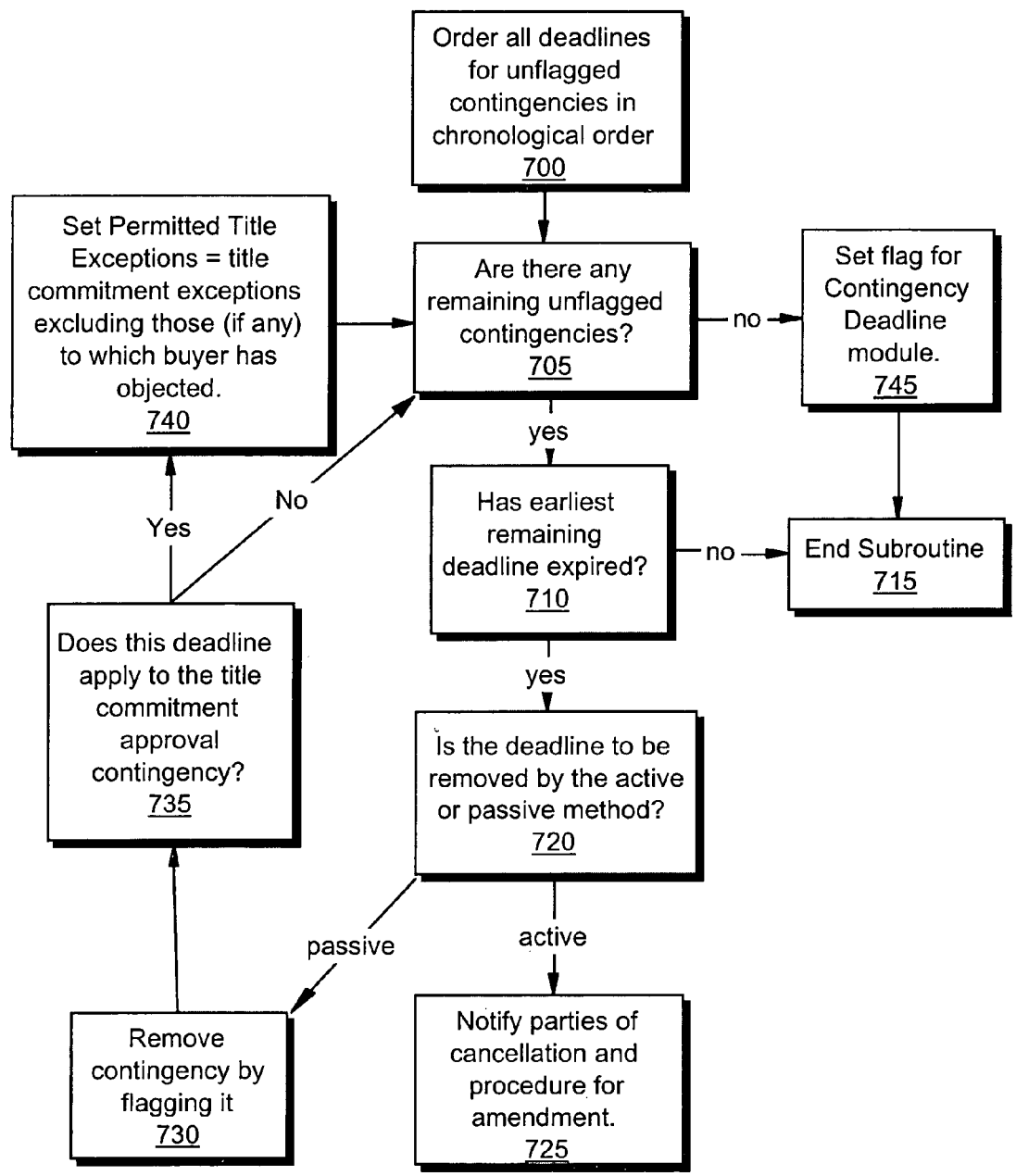
FIG. 7 is a flow diagram of a subroutine that determines whether any contingency deadlines have expired and processes such expiration in accordance with the closing instructions.

Returning now to the main routine at step 230, the closing server runs the contingency deadline module concurrently with the other due diligence modules. The steps for the contingency deadline module are shown in FIG. 7. This module enables the closing server to determine whether any contingency deadlines have expired then applies the rules of the closing instructions to any such expiration. At step 700 the closing server accesses the transaction database and places all of the deadlines for unflagged contingencies in chronological order. At step 705 so long as there are any remaining contingencies it proceeds to step 710. Otherwise, it continues to step 745.

At step 710 the closing server determines whether the earliest remaining deadline (for an unflagged contingency) has expired by comparing the date of the deadline to the current date. If it has expired, it continues to step 720. Otherwise, it proceeds to step 715. At step 715, it ends the subroutine without flagging it as complete and returns to the main routine.

If the earliest remaining deadline has expired, then at step 720 the closing server determines whether according to the closing instructions, the applicable contingency is to be removed by the active or passive method. (Note that for purposes of this invention, the contingency for delivery of the title commitment may only be removed by the active method.) If it is to be removed by the active method (meaning the sale cancels in the absence of active removal) it proceeds to step 725. Otherwise, it continues to step 730. At step 725, the closing server sends cancellation notice to the parties together with an explanation of the amendment procedure.

If the applicable contingency is to be removed by the passive method (meaning it is to be removed upon expiration of the deadline without a notice of disapproval), then at step 730 the closing server removes the contingency by flagging it. At step 735 the closing server determines whether the applicable deadline is the approval of the title insurance commitment. If it is, it proceeds to step 740. Otherwise, it returns to step 705. At step 740, if the applicable deadline is the buyer's approval of the title commitment, the closing server sets the permitted title exceptions field to be equal to the title exceptions in the title commitment. If the applicable deadline is the seller's approval of the title commitment (meaning the buyer has already objected to certain exceptions in the title commitment), the closing server sets the permitted title exceptions field to be equal to the title exceptions in the title commitment, excluding those to which the buyer has objected. At step 705, the closing server repeats the process. Once there are no remaining unflagged contingencies, the closing server proceeds to step 745. At step 745 it sets the flag for the contingency deadline module. It then continues to step 715 where it ends the subroutine as complete and returns to the main routine.

At step 232, the closing server checks the transaction database to determine whether there are any existing loans. If there are, it runs the Existing Loan Module (FIG. 6) concurrently with the other Due Diligence Modules. At step 600, the closing server accesses the transaction database and retrieves the relevant information on existing loans. For each loan being paid off, the closing server generates and sends a payoff demand to the lender, and flags the lender request field for such loan. The payoff demand will consist of the following items from the transaction database: the loan number, the borrower's name, the closing date, and the transaction number together with a request for the lender's wire transfer information. For each loan being assumed, the closing server generates and sends a balance request to the lender, and flags the lender request field for such loan. The request for outstanding balance consists of the same parameters as a payoff request, except that the form requests the current balance and does not request the lender's wire transfer information.

At step 610, upon receipt of payoff demand and balance statements, the closing server is triggered to enter the payoff or balance amount in the appropriate field in the transaction database for such loan and to flag the lender response field as complete for such loan. At step 620, it checks to determine whether there are any existing loans for which the lender response field is not flagged. If there are, the closing server continues to step 640 where the module ends without having been flagged as complete. Otherwise, it proceeds to step 630. At step 630, the closing server flags the existing loan module as complete and ends the module at step 640. It then returns to step 234 in the main routine.

Pre-Settlement Modules

At step 234, when all of the due diligence modules have been flagged as complete, the closing server proceeds to step 242 in FIG. 2C. At step 242, the closing server accesses the transaction database to determine whether the closing deadline (if any is set forth in the closing instructions) has expired. If the deadline has expired, it proceeds to step 244. Otherwise it continues to step 246. At 244, the closing server notifies all parties of cancellation and the procedure for extension.

At step 246, the closing server runs all applicable pre-settlement modules. At step 248, the closing server follows the steps outlined in FIG. 12 to generate and enable execution of the deed by the seller. At step 1200, the closing server accesses the transaction database and retrieves the form of deed specified by the parties for transferring title. At step 1210, the closing server completes the deed by retrieving from the transaction database the names of the seller and buyer and the legal description and entering such information into the corresponding fields in the deed. The completed deed is entered in the transaction database.

At step 1220, the closing server notifies the seller that the deed is ready for the seller's signature and notarization. After the seller signs and notarizes the deed, the seller sends it to the closing server 1230. If the county in which the property is located accepts digitally signed and notarized deeds for recordation, the seller accesses the website, reviews the deed on the seller's web browser, applies his or her digital signature and has the deed digitally notarized. If the county in which the property is located does not accept digitally signed and notarized deeds, the seller is instructed to print the deed, physically sign it and have it notarized, and then mail it to the closing agent.

In the case of a digitally signed and notarized deed, when the closing server receives the signed and notarized deed, the closing server flags this condition as complete 1240. In the case of a paper deed, at step 1240 the human closing agent uses its computer 108 to access the transaction database, and manually flags this condition as complete. The closing server ends this module at step 1250 and returns to step 256 in FIG. 2C. If all presettlement modules are not yet complete, the closing server waits the prescribed period at step 240, checks to determine whether the closing deadline has expired at step 242, and assuming it has not expired, runs each incomplete presettlement module at step 246.

Figure 13:
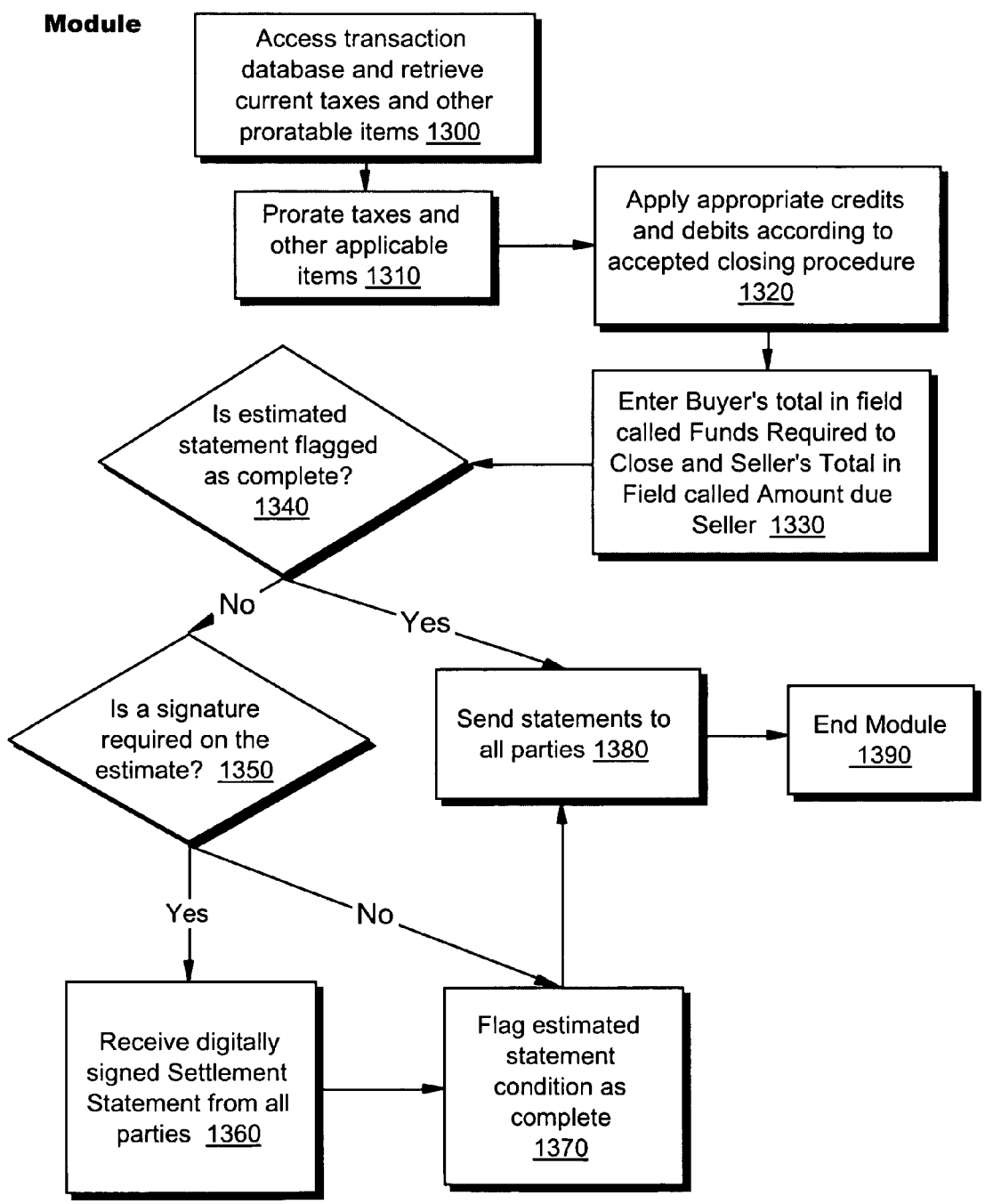
FIG. 13 is a flow diagram of a subroutine executed by the system shown in FIG. 1A that enables a settlement statement to be generated and digitally signed by the parties.

At step 250, the closing server runs the subroutine for generating a settlement statement as shown in FIG. 13. At step 1300, the closing server accesses the transaction database and retrieves the current taxes for the property. This information may be transmitted to the closing server by the title insurance company in the same fashion as the title commitment. Otherwise, the human closing agent must determine and manually enter this amount into the transaction database using the closing agent's computer 108. During step 1300, the closing server also retrieves from the transaction database any other items to be prorated, such as rent, if applicable. At step 1310, the closing server prorates each item as of the closing date according to conventional closing procedure. For example, the seller may be debited, and the buyer credited, for taxes due and payable for the period preceding the closing date. At step 1320, the closing server retrieves all other applicable items from the transaction database and applies appropriate credits and debits per accepted closing procedure. For example, the closing server will credit the seller and debit the buyer for the purchase price, credit the buyer and debit the seller for the balance of all loans being assumed, debit the seller and credit the applicable lender for the balance of any loan being paid off, and debit the buyer and seller, respectively, for all closing expenses allocated to them according to the closing instructions. At step 1330, the closing server adds the buyer's debits, subtracts the buyer's credits and enters the resulting amount in the transaction database in a field called Funds Required to Close; it also adds the seller's credits, subtracts the seller's debits and enters the resulting amount in the transaction database in a field called Amount due Seller.

At step 1340, the closing server accesses the transaction database to determine whether the estimated settlement statement has been flagged as complete. If it has, the closing server proceeds to step 1380. Otherwise, it continues to step 1350. At step 1350, the closing server accesses the transaction database to determine whether the closing instructions require that the parties sign the estimated settlement statement. If they do, the closing server continues to step 1360. Otherwise it proceeds to step 1370.

At step 1360, the closing server makes the settlement statement available to the parties for viewing and signature. It then ends this module as incomplete and waits until it receives both signatures. When the closing server receives the signed settlement statement from both parties, it continues to step 1370 where it flags this presettlement condition as complete. At step 1380, the closing server sends the settlement statements to all specified parties. At step 1390, the closing server ends the module and returns to step 256 in the main routine.

Figure 14:
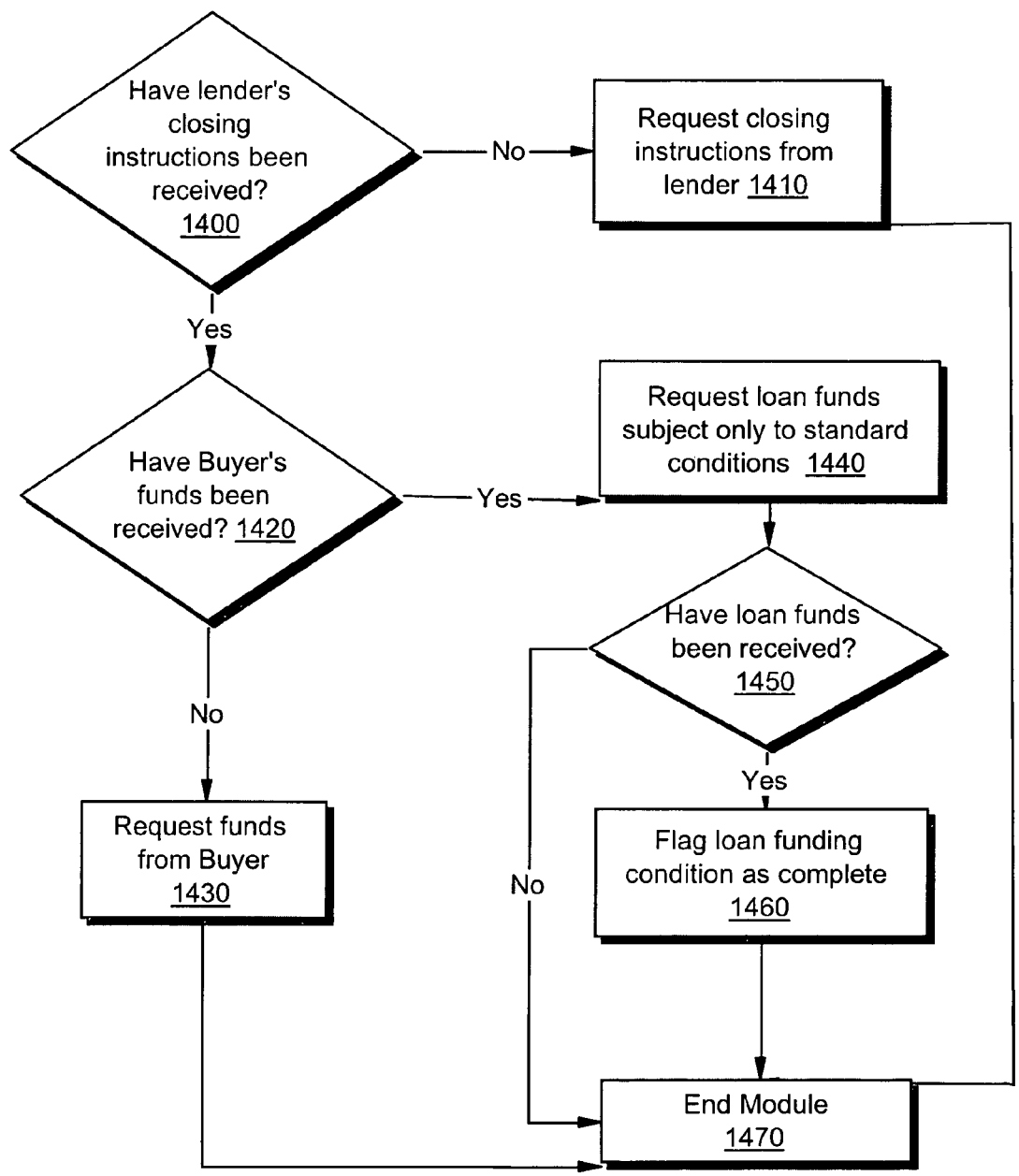
FIG. 14 is a flow diagram of a subroutine executed by the system shown in FIG. 1A that enables the request and receipt of loan proceeds.

If the buyer is obtaining a loan to pay part of the purchase price and if the lenders' closing instructions direct the closing agent to receive the loan funds directly from the lender, then at step 252 the closing server will run the loan funding subroutine outlined in FIG. 14. At step 1400, the closing server accesses the transaction database to determine whether it has received standardized closing instructions from the lender. For the purposes of this invention, a standardized lender's closing instruction identifies the transaction, includes a completed mortgage or deed of trust, sets forth the lender's name, the buyer/borrower's name, the amount of the loan, the net proceeds being delivered, and complete title insurance requirements, and contains no conditions to release of the loan funds other than the following conditions ("standard conditions"): transfer of ownership of the property to the buyer, execution and recordation of the mortgage or deed of trust, and issuance of the lender's title insurance policy in accordance with the lender's requirements. In a preferred embodiment, the lender transmits all of the foregoing to the closing server by registering with the system in the manner described in FIG. 11, and then submitting the data via XML tagged files directly to the closing server for processing. Another embodiment would have the lender filling in fields for the above information on its web browser. The closing server maps such fields to the appropriate fields in the transaction database and enters such information accordingly when submitted by the lender. In another preferred embodiment, as to the parameter for permitted exceptions to title, the lender can adopt the buyer's permitted title exceptions set forth in the transaction database by viewing them, clicking on a button signifying approval and affixing the lender's digital signature.

If the lender has not submitted standardized closing instructions, then the closing server continues to step 1410. Otherwise, it proceeds to step 1420. At step 1410, the closing server sends to the lender and the buyer a request for standardized closing instructions. It then ends the module without flagging it as complete 1470. At step 1420, the closing server checks to determine whether it has received the buyer's required down payment. It does this by subtracting the net loan proceeds specified in the lender's closing instructions from the Funds required to Close, both of which numbers it retrieves from the transaction database. It then compares the result with the trust account balance that is calculated by the subroutine shown in the Trust Account Module, FIG. 4. (The steps for FIG. 4 are described below.) If the trust account balance equals or exceeds this amount, then the buyer has made the required deposit and the closing server proceeds to step 1440. Otherwise, it continues to step 1430, where it sends a request to the buyer for the calculated funds shortfall. It then ends the module without having flagged it as complete 1470.

At step 1440, the closing server requests the loan funds subject only to the standard conditions. At step 1450, the closing server accesses the transaction database to determine whether the loan funds have been received. If they have not, the closing server proceeds to step 1470 where it ends the module without flagging it as complete. Otherwise, the closing server continues to step 1460. At step 1460, it flags this module as complete and returns to step 256 in FIG. 2C.

At step 254, the closing server determines whether the current date is the day before the date set in the closing instructions for recording the deed. (Note that unless otherwise specified in the closing instructions, the recordation date is the same as the settlement date where funds are to be disbursed after recordation and the recordation date is the business day following settlement where funds are to be disbursed before recordation as determined in Step 280.) If it is not, it runs other transactions until the day before recordation. On the day before recordation, the closing server runs the title insurance policy module shown in FIG. 15. This routine is run for both the buyer and lender's title insurance policy, if applicable.

The closing server begins the title insurance policy module at step 1500 by obtaining any updates to the title insurance company's current title commitment for this transaction. At step 1510 it determines whether the current exceptions to title match the permitted exceptions to title. In a preferred embodiment, the title company automatically updates the title commitment fields in the transaction database and any such changes trigger the closing server to compare the current title commitment to the approved title commitment, which is the title commitment as approved by the parties as described above. (Note that the approved title commitment includes only the permitted exceptions to title and no others.) If the updated title commitment does not match the approved title commitment, the closing server removes the flag from the title commitment approval and correction fields and reruns the same routines for approval, disapproval and correction of such updated title commitment as it ran for the original title commitment (FIGS. 5, 7 and 9). Thus approval of the title commitment remains current. In another embodiment, the closing server sends a copy of the approved title commitment to the title insurance company by electronic mail and requests that the title insurance company return it on the day before recordation with its digital signature affixed to the transmission. The closing server would then compare such commitment with the approved title commitment to confirm that they match. Such email request would be sent at an earlier date than the day before closing, to allow time for processing and return by the receiving party.

If the current exceptions to title do not match the permitted exceptions to title 1510 or if the current commitment does not match the approved commitment in any other way 1520, the closing server proceeds to step 1540. Otherwise, it continues to step 1530. At step 1540 the closing server notifies the parties of the discrepancy together with instructions of the procedure for amending the closing instructions. The closing server then proceeds to step 1560 and ends the module without flagging it as complete.

At step 1530 the closing server retrieves the conditions to issuance from the transaction database to determine whether there are any nonstandard conditions to issuance. A nonstandard condition to issuance is any condition other than the following standard conditions: recordation of the deed, payment of the sales consideration, payment of the policy premium and payment of taxes due and payable. In the preferred embodiment, the standard conditions to issuance are included in the title order and automatically entered by the closing server into the title insurance commitment conditions to issuance. The title insurance company copies the standard conditions from the title order and adds any other (nonstandard) conditions to issuance when it issues the title commitment. If there are one or more nonstandard conditions to issuance, the closing server continues to step 1540. Otherwise, it continues to step 1550 where it flags the title insurance policy module as complete. At step 1560 it ends the module and returns to step 256 in the main routine.

Settlement

Figure 2D:
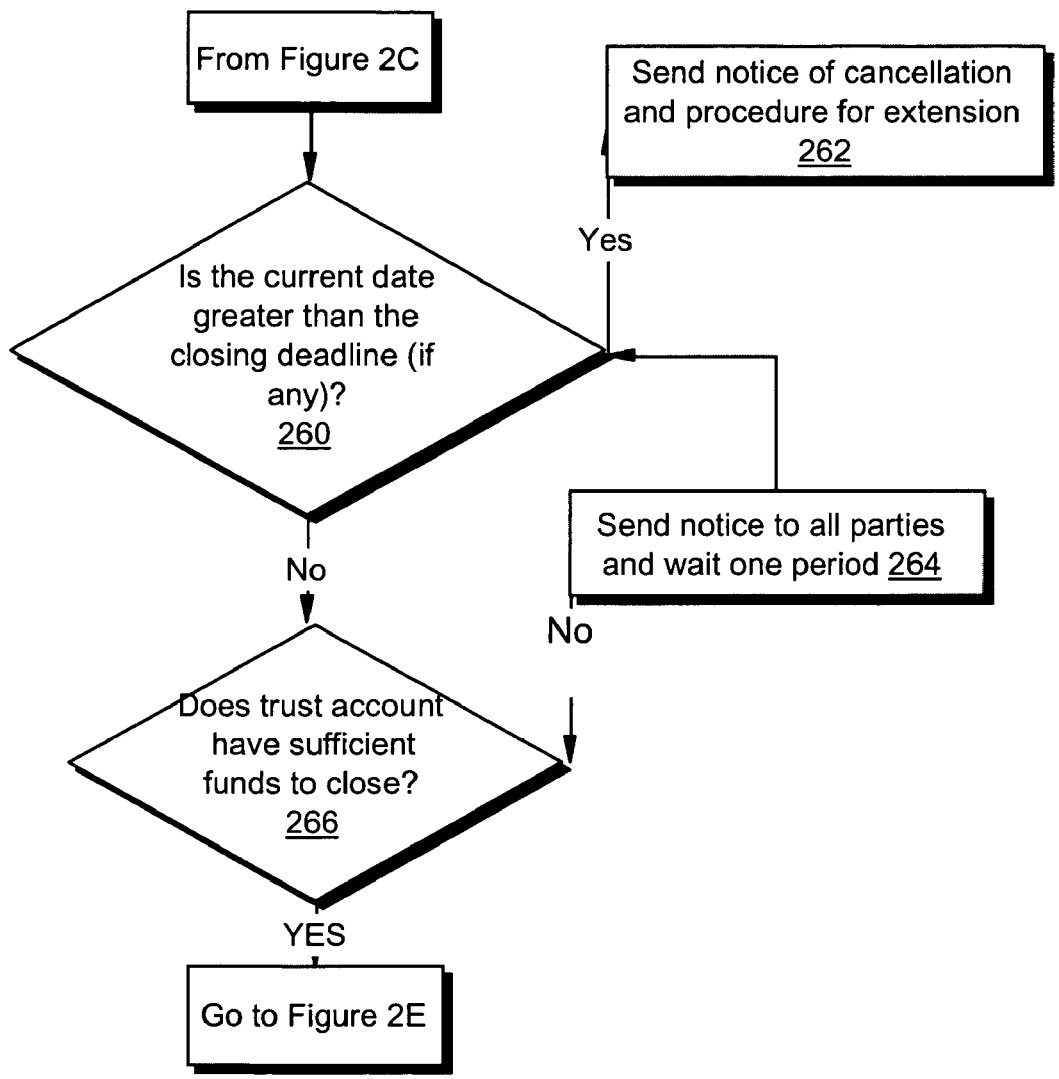
Figure 2E:
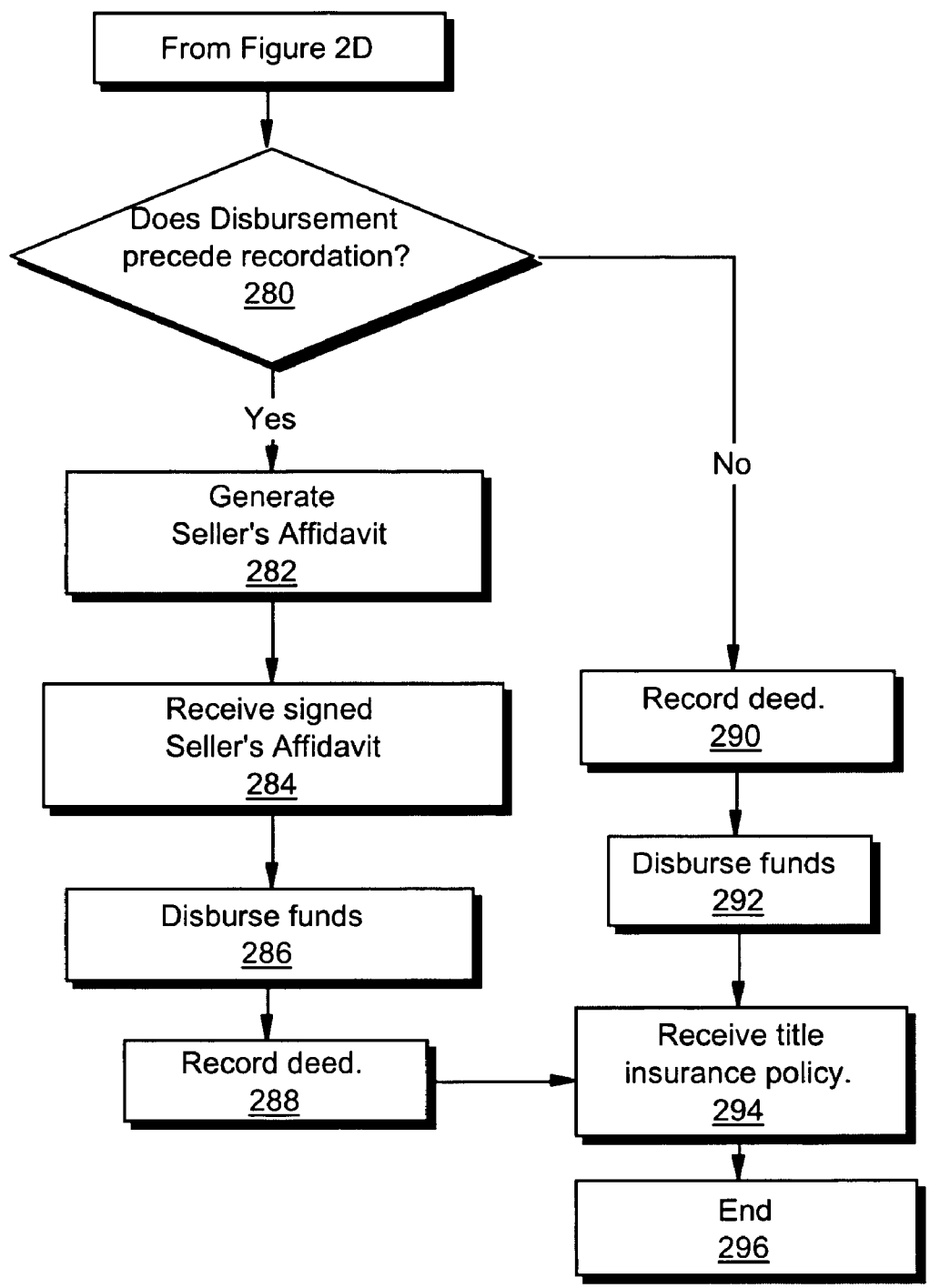
Figure 6:
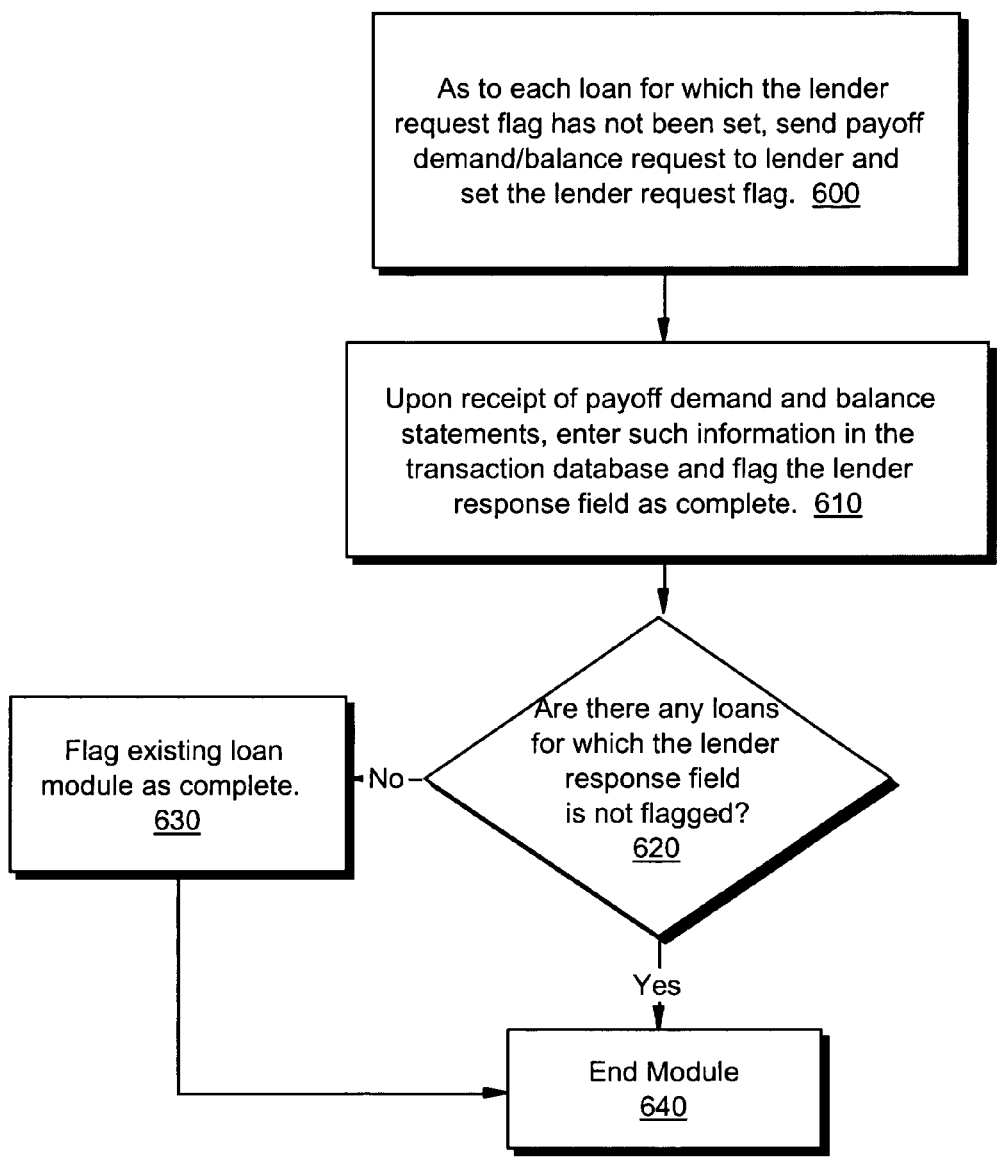
FIG. 6 is a flow diagram of a subroutine executed by the system shown in FIG. 1A that obtains payoff or balance information on any existing loans on the property.

At step 256, when all of the presettlement modules have been flagged as complete, the closing server proceeds to step 260 in FIG. 2D. At step 260 the closing server determines whether the closing deadline, if any, has passed. If it has it sends a notice of cancellation 262. If it has not, it proceeds to step 266. At step 266 the closing server compares the trust account balance to the funds required to close, both of which amounts it retrieves from the applicable fields in the transaction database. If the trust account balance equals or exceeds the funds required to close, there are sufficient funds to close and it proceeds to step 280 in FIG. 2E. If there are not sufficient funds to close it proceeds to step 264. At step 264 the closing server waits the prescribed period (for example, two hours) and then returns to step 260 to determine whether the closing deadline has passed. It continues this process until either the trust account has sufficient funds to close, in which case, it proceeds to settlement at step 280 or the closing deadline expires, in which case, it sends notice of cancellation 262.

At step 280 the closing server determines whether in this transaction, funds are to be disbursed before or after recordation. Funds will be disbursed before recordation if the buyer is receiving title insurance and if the property is located in states such as Florida and New York, which require so called gap insurance. In all other cases, disbursement will be made only after the deed is recorded. If funds are being disbursed before recordation then at step 282 the closing server generates the seller's affidavit by retrieving a form of seller's affidavit from the transaction database and entering the appropriate transaction information in the fields of the seller's affidavit. It then notifies the seller that the affidavit is available for signing via the web browser. At step 284 the closing server receives the signed seller's affidavit. At step 286, the closing server runs the settlement statement routine (FIG. 13) and updates the transaction database to reflect any adjustments in fields for the Amount due Seller and the amounts due to other parties. It then sends instructions to the financial institution of the closing agent to disburse trust account funds in accordance with such updated amounts.

At step 288 the closing server records the deed, and deed of trust or mortgage if applicable. If the county where the property is located accepts digital signatures it transmits the documents by electronic means to the county. If not, it sends instructions to the human closing agent to physically record the documents in the county records in which case the human closing agent will use its computer to manually mark the transaction database to reflect recordation. After recordation, the closing server receives and transmits the title insurance policy or policies to the buyer and lender, as applicable 294. The transaction is complete at step 296.

If disbursement follows recordation, then at step 290 the closing server causes the deed (and deed of trust or mortgage, if applicable) to be recorded in the manner described above for step 288. At step 292, the closing server disburses funds in the manner described above for step 286. The closing server receives and transmits the title insurance policy or policies to the buyer and lender, as applicable 294. The transaction is complete at step 296.

Trust Accounting

At the point at which there is a transfer of money for the benefit of the transaction, the closing server executes the process shown in FIG. 4. At step 410, upon receipt of a deposit confirmation from the closing agent's bank, or upon a disbursement confirmation from the closing agent, the closing server determines the applicable transaction. In the preferred embodiment, both the closing agent and its bank are associated with the applicable transaction and send electronic notification of deposits and disbursements which identify the applicable transaction by transaction ID number. In an alternative embodiment, the closing agent's bank sends notification of deposits (with the transaction ID number) by fax or mail to the closing agent who manually enters such information from its computer into the transaction database.

At step 420, the closing server accesses the transaction database and enters the deposit or disbursement into the record for the applicable transaction. At step 430, the closing server adjusts the trust account balance by appropriate addition or subtraction to reflect the change in money balance. The balance and activity of the account are always viewable via a Web browser to authorized parties, such as the Buyer and Seller. The closing server ends the module at step 440 and returns to the point in the main process from whence it came.

Amendment of the Closing Instructions

The amendment module (FIG. 10) outlines the subroutine for enabling amendment of the closing instructions. This subroutine is triggered when either the seller or the buyer sends the closing server a request for an amendment. At step 1000, the closing server presents such party with the closings instructions in the form of the completed closing questionnaire. At step 1010, such party makes the desired modification to the closing questionnaire and digitally signs and sends the proposed amendment of closing instructions to the closing server. The closing server temporarily enters such proposed changes into the transaction database. At step 1020, the closing server notifies the other party to the transaction of the proposed amendment, along with the possible acceptable responses, including the deadline for said response. At step 1030, the closing server receives the other party's response. If the other party has accepted such amendment and digitally signed its acceptance, the closing server continues to step 1050. Otherwise, the closing server proceeds to step 1040.

At step 1040 the closing server notifies the proposing party that the amendment was declined. The closing server then ends the module at step 1060 and returns to the main sequence.

At step 1050 the closing server accesses the closing questionnaire database to determine the mapping of the closing questionnaire modifications into the applicable fields of the transaction database. The closing server then unlocks the relevant fields in the transaction database, modifies such fields in accordance with the amendment, and relocks the fields. It also unflags any applicable cancellation. The closing server then ends the module at step 1060 and returns to the main sequence.

Registration and Association

FIG. 11 outlines the steps for registering a new user and associating such user with an existing transaction. At step 1100, when a user accesses the system, the closing server presents the user with a choice of "logging in" or registering. If the user is logging in, the closing server proceeds to step 1120. Otherwise, the closing server continues to step 1110. At step 1110, the user registers. In the preferred embodiment the closing server enables registration by presenting the user with a form, via its Web browser, for entering specific identifying information required by the system for registering that entity. Such identifying information will include the entity's name, address, contact data, user group, public key certificate and email address. The user group is a grouping of entities (such as title insurance companies) that perform the same functions in the closing process. The entity will also be prompted to enter a user name and password. Finally, the entity will be prompted to submit additional group specific information and to submit information on the methods for accessing data within that entity's data processing systems (such as the preferred method of XML). The web browser client sends the applicable information via TCP/IP over the Internet to the closing server.

In an alternative embodiment, a form is emailed to the entity for printing out and returning via postal mail. In yet another alternative embodiment, the entity may register directly at the physical offices of another entity that is already registered in the system.

In all cases, the closing server establishes a record containing such identification information in the transaction database for the particular user, and assigns the user a unique ID number and a user group. Each user group is assigned a specific set of permissions to access the transaction database. An entity may have more than one association, if that entity performs multiple functions. These functions may apply individually or collectively to any particular transaction, as specified in the controlling contract.

An existing user "logs in" in the conventional manner by entering his or her name and password. The name and password are encrypted using SSL, SET or a similar security method.

At step 1120, the closing server presents the user with the choice of exiting, being associating with an existing transaction, or initiating a new transaction. If the user chooses to initiate a new transaction, the closing server proceeds to step 212 in FIG. 2A. If the user chooses to be associated with an existing transaction, the closing server proceeds to step 1140. If the user chooses to exit, the closing server proceeds to step 1170 and ends this module.

At step 1140, the closing server prompts the user to enter the transaction ID number for the transaction with which it wishes to be associated. The closing server then determines whether this user has been approved by the appropriate parties to be associated with such transaction. In the preferred embodiment, before the closing instructions are completed, the only parties who may be associated with a specific transaction are the buyer, seller, their real estate agents and the closing agent. Additional users who may be associated with a transaction after the closing instructions are completed include lenders, a title insurance company, and the closing agent's bank. The closing instructions will either identify such additional users or will specify the party or parties with the approval right for entities within certain user groups. For example, the closing instructions may allow the buyer to approve any entity as a lender with the permissions applicable to the user group for lenders. In the preferred embodiment, a user must first register with the system before being associated with an existing transaction. The party with an approval right identifies an approved entity by supplying the closing server with such entity's user ID number. In an alternative embodiment, the entity being approved need not be registered as a user, but must be prepared to authenticate its transmissions by use of public key cryptography. The party giving approval supplies the closing server with such entity's public key certificate. In another embodiment, if neither of the foregoing means is available, the party giving approval supplies the closing server with other identifying information specific to such entity, such as the entity's professional or business license number.

In the preferred embodiment (in which only registered users may be approved), the closing server accesses the applicable transaction record in the transaction database to determine whether this user's ID number is included as an approved ID number. In alternate embodiments (in which approved users are identified by public key cryptography or other means), the closing server prompts the user to affix its digital signature or provide an identification number. The closing server then accesses the applicable transaction record in the transaction database to determine whether the identification information provided by the user matches the identification information for approved users.

If the user is not approved, then the closing server proceeds to step 1150. Otherwise, the closing server continues to step 1160. At step 1150, the closing server so notifies the user. The closing server then skips to step 1170. If the party is approved, then at step 1160 the closing server associates the party with the transaction by making appropriate entries in the transaction database. The closing server also notifies all parties of such association. At step 1170, the closing server ends the module.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A closing system for closing a real estate transaction between a plurality of parties and transferring ownership of property via a real estate deed, the system comprising:
    a closing server adaptable to internet communications, wherein the closing server comprises:
        a closing database, wherein the closing database comprises:
            a closing module executed on the closing server, wherein the closing module presents:
                at least one pre-defined closing condition, wherein the at least one pre-defined closing condition comprises:
                    at least one first deadline for approving or disapproving the pre-defined closing condition;
                    at least one first identity of the plurality of parties authorized to approve or disapprove the at least one pre-defined closing condition before the at least one first deadline expires;
                    a first active classifier, wherein the at least one pre-defined closing condition is deemed to have failed if not approved before the at least one first deadline expires;
                    a first passive classifier, wherein the at least one pre-defined closing condition is deemed satisfied if not disapproved before the at least one first deadline expires; and
                at least one custom closing condition, wherein the at least one custom closing condition comprises:
                    at least one second deadline for approving or disapproving the at least one custom closing condition;
                    at least one second identity of the plurality of parties authorized to approve or disapprove the at least one custom closing condition before the at least one second deadline expires;
                    a second active classifier, wherein the at least one custom closing condition is deemed to have failed if not approved before the at least one second deadline expires;
                    a second passive classifier, wherein the at least one custom closing condition is deemed satisfied if not disapproved before the at least one second deadline expires;
        a title insurance module correlated with the closing database, wherein the title insurance module executed on the closing server presents:
            a plurality of title insurance company identifying information;
            a plurality of title insurance policies associated with the plurality of title insurance identifying information, wherein the plurality of title insurance policies each comprise a plurality of terms; and
    at least one computer processor having identity verifier logic and resources for verifying the identities of the plurality of parties.

2. The closing system as in claim 1, wherein the at least one computer processor having identity-verifier logic and resources for verifying the identities of the plurality of parties further comprises encryption logic and resources for verifying the identities of the plurality of parties.

3. The closing system as in claim 2, wherein the identity-verifier logic and resources for verifying the identities of the plurality of parties further comprises logic and resources for associating an electronic signature of each of the plurality of parties with closing the real estate transaction.

4. The closing system as in claim 1 further comprising at least one internet browser client, wherein the at least one internet browser client is adaptable to internet connecting with the closing server, wherein the at least one browser client comprises means for selecting at least one of the at least one pre-defined closing conditions.

5. The closing system as in claim 1 further comprising at least one internet browser client, wherein the at least one internet browser client is adaptable to Internet connecting with the closing server, wherein the at least one browser client comprises means for selecting at least one of the at least one predefined closing conditions.

6. The closing system as in claim 1 further comprising an internet connection with at least one title insurance company associated with at least one of the plurality of title insurance company identifying information.

7. The closing system as in claim 1, wherein the closing database further comprises a lender financial module, wherein the lender financial module comprises:
   at least one financial lender identifier; and
   a plurality of standard lender conditions associated with the at least one financial lender identifier and further associated with closing the real estate transaction.

8. The closing system as in claim 7 wherein the plurality of standard lender conditions comprises:
   transfer of ownership of the property to a borrower;
   execution and recordation of a mortgage or deed of trust associated with the property; and
   issuance of a policy of title insurance associated with the property.

9. The closing system as in claim 8 further comprising an internet connection with at least one financial lender associated with the at least one financial lender identifier.

10. The closing system as in claim 1 wherein the predefined closing conditions comprise at least one title insurance condition.

11. The closing system as in claim 10 wherein the at least one title insurance condition comprises:
    a receiving deadline for receiving a title commitment; and
    an approval deadline for approving or disapproving the title commitment.

12. The closing system as in claim 11 wherein the title commitment comprises a plurality of title exceptions wherein each title exception comprises a plurality of title exception fields in the closing database.

13. The closing system as in claim 12 wherein the plurality of title exception fields comprises at least one approval field for party approval or disapproval.

14. The closing system as in claim 1, wherein the closing database further comprises an authorized agent module, wherein the authorized agent module comprises at least one authorized agent identifier.

15. The closing system as in claim 14 further comprising an internet connection with at least one authorized agent associated with the at least one authorized agent identifier.

16. The closing system as in claim 1, wherein the closing database further comprises a property module, wherein the property module comprises at least one geographic property description, wherein the at least one geographic property description comprises:
    property location; and
    property type.

* * * * *